US008717360B2

(12) United States Patent
Vesely et al.

(10) Patent No.: US 8,717,360 B2
(45) Date of Patent: May 6, 2014

(54) PRESENTING A VIEW WITHIN A THREE DIMENSIONAL SCENE

(75) Inventors: Michael A. Vesely, Santa Cruz, CA (US); Alan S. Gray, San Jose, CA (US)

(73) Assignee: zSpace, Inc., Austin, TX (US)

( * ) Notice: Subject to any disclaimer, the term of this patent is extended or adjusted under 35 U.S.C. 154(b) by 692 days.

(21) Appl. No.: 12/797,958

(22) Filed: Jun. 10, 2010

(65) Prior Publication Data

US 2011/0187706 A1    Aug. 4, 2011

Related U.S. Application Data

(60) Provisional application No. 61/299,538, filed on Jan. 29, 2010.

(51) Int. Cl.
G06T 15/20  (2011.01)
G06T 15/10  (2011.01)

(52) U.S. Cl.
USPC ........................................... 345/427; 345/419

(58) Field of Classification Search
None
See application file for complete search history.

(56) References Cited

U.S. PATENT DOCUMENTS

| 1,592,034 | A | 7/1926 | Macy et al. |
|---|---|---|---|
| 4,182,053 | A | 1/1980 | Allen et al. |
| 4,291,380 | A | 9/1981 | Rohner |
| 4,677,576 | A | 6/1987 | Berlin, Jr. et al. |
| 4,763,280 | A | 8/1988 | Robinson et al. |
| 4,795,248 | A | 1/1989 | Okada et al. |
| 4,984,179 | A | 1/1991 | Waldern et al. |
| 5,079,699 | A | 1/1992 | Tuy et al. |
| 5,168,531 | A | 12/1992 | Sigel |
| 5,237,647 | A | 8/1993 | Roberts et al. |
| 5,264,964 | A | 11/1993 | Faris |
| 5,276,785 | A | 1/1994 | Mackinlay et al. |
| 5,287,437 | A | 2/1994 | Deering |
| 5,327,285 | A | 7/1994 | Faris |
| 5,361,386 | A | 11/1994 | Watkins et al. |
| 5,381,127 | A | 1/1995 | Kheiu |
| 5,381,158 | A | 1/1995 | Takahara et al. |

(Continued)

FOREIGN PATENT DOCUMENTS

GB    2396421    6/2004

OTHER PUBLICATIONS

Plumlee, Matthew, and Colin Ware. "Integrating multiple 3d views through frame-of-reference interaction." Coordinated and Multiple Views in Exploratory Visualization, 2003. Proceedings. International Conference on. IEEE, 2003.*

(Continued)

Primary Examiner — Daniel Hajnik
(74) Attorney, Agent, or Firm — Meyertons Hood Kivlin Kowert & Goetzel, P.C.; Jeffrey C. Hood; Joel L. Stevens

(57) ABSTRACT

Presenting a view based on a virtual viewpoint in a three dimensional (3D) scene. The 3D scene may be presented by at least one display, which includes displaying at least one stereoscopic image of the 3D scene by the display(s). The 3D scene may be presented according to a first viewpoint. A virtual viewpoint may be determined within the 3D scene that is different than the first viewpoint. The view of the 3D scene may be presented on the display(s) according to the virtual viewpoint and/or the first view point. The presentation of the view of the 3D scene is performed concurrently with presenting the 3D scene.

34 Claims, 13 Drawing Sheets

(56) References Cited

U.S. PATENT DOCUMENTS

| | | | |
|---|---|---|---|
| 5,400,177 A | 3/1995 | Petitto et al. |
| 5,438,623 A | 8/1995 | Begault |
| 5,515,079 A | 5/1996 | Hauck |
| 5,537,144 A | 7/1996 | Faris |
| 5,559,937 A | 9/1996 | Takeda |
| 5,574,835 A | 11/1996 | Duluk et al. |
| 5,574,836 A | 11/1996 | Broemmelsiek |
| 5,652,617 A | 7/1997 | Barbour |
| 5,659,969 A | 8/1997 | Butler et al. |
| 5,686,975 A | 11/1997 | Lipton |
| 5,696,892 A | 12/1997 | Redmann et al. |
| 5,745,164 A | 4/1998 | Faris |
| 5,795,154 A | 8/1998 | Woods |
| 5,844,717 A | 12/1998 | Faris |
| 5,862,229 A | 1/1999 | Shimizu |
| 5,880,733 A | 3/1999 | Horvitz et al. |
| 5,880,883 A | 3/1999 | Sudo |
| 5,945,985 A | 8/1999 | Babin et al. |
| 5,956,046 A | 9/1999 | Kehlet et al. |
| 6,028,593 A | 2/2000 | Rosenberg et al. |
| 6,034,717 A | 3/2000 | Dentinger et al. |
| 6,064,354 A | 5/2000 | DeLuca |
| 6,069,649 A | 5/2000 | Hattori |
| 6,072,495 A | 6/2000 | Watanabe et al. |
| 6,100,903 A | 8/2000 | Goettsche |
| 6,108,005 A | 8/2000 | Starks et al. |
| 6,115,022 A | 9/2000 | Mayer et al. |
| 6,125,337 A | 9/2000 | Rosenberg et al. |
| 6,134,506 A | 10/2000 | Rosenberg et al. |
| 6,139,434 A | 10/2000 | Miyamoto et al. |
| 6,163,336 A | 12/2000 | Richards |
| 6,195,205 B1 | 2/2001 | Faris |
| 6,198,524 B1 | 3/2001 | Osgood |
| 6,208,346 B1 | 3/2001 | Washio et al. |
| 6,211,848 B1 | 4/2001 | Plesniak et al. |
| 6,226,008 B1 | 5/2001 | Watanabe et al. |
| 6,241,609 B1 | 6/2001 | Rutgers |
| 6,252,707 B1 | 6/2001 | Kleinberger et al. |
| 6,317,127 B1 | 11/2001 | Dailey et al. |
| 6,346,938 B1 | 2/2002 | Chan et al. |
| 6,351,280 B1 | 2/2002 | Benton |
| 6,373,482 B1 | 4/2002 | Migdel et al. |
| 6,384,971 B1 | 5/2002 | Faris |
| 6,392,689 B1 | 5/2002 | Dolgoff |
| 6,431,705 B1 | 8/2002 | Linden |
| 6,452,593 B1 | 9/2002 | Challener |
| 6,478,432 B1 | 11/2002 | Dyner |
| 6,483,499 B1 | 11/2002 | Li et al. |
| 6,529,210 B1 | 3/2003 | Rees |
| 6,556,197 B1 | 4/2003 | Van Hook et al. |
| 6,593,924 B1 | 7/2003 | Lake et al. |
| 6,614,427 B1 | 9/2003 | Aubrey |
| 6,618,049 B1 | 9/2003 | Hansen |
| 6,643,124 B1 | 11/2003 | Wilk |
| 6,680,735 B1 | 1/2004 | Seller et al. |
| 6,690,337 B1 | 2/2004 | Mayer et al. |
| 6,715,620 B2 | 4/2004 | Taschek |
| 6,734,847 B1 | 5/2004 | Baldeweg et al. |
| 6,753,847 B2 | 6/2004 | Kurtenbach et al. |
| 6,827,446 B2 | 12/2004 | Beckett et al. |
| 6,842,175 B1 * | 1/2005 | Schmalstieg et al. ......... 345/427 |
| 6,882,953 B2 | 4/2005 | D'Hooge et al. |
| 6,898,307 B1 | 5/2005 | Harrington |
| 6,912,490 B2 | 6/2005 | Dodge |
| 6,943,754 B2 | 9/2005 | Aughey et al. |
| 6,956,576 B1 | 10/2005 | Deering et al. |
| 6,987,512 B2 | 1/2006 | Robertson et al. |
| 7,102,635 B2 | 9/2006 | Shih et al. |
| 7,161,615 B2 | 1/2007 | Pretzer et al. |
| 7,236,618 B1 | 6/2007 | Chui et al. |
| 7,249,952 B2 | 7/2007 | Ranta et al. |
| 7,321,682 B2 | 1/2008 | Tooyama et al. |
| 7,353,134 B2 | 4/2008 | Cirielli |
| 7,477,232 B2 | 1/2009 | Serra et al. |
| 7,486,291 B2 * | 2/2009 | Berson et al. ................. 345/427 |
| 7,583,252 B2 | 9/2009 | Kurtenbach et al. |
| 2001/0033327 A1 | 10/2001 | Uomori et al. |
| 2002/0008906 A1 | 1/2002 | Tomita |
| 2002/0041327 A1 | 4/2002 | Hildreth |
| 2002/0080094 A1 | 6/2002 | Biocca et al. |
| 2002/0113752 A1 | 8/2002 | Sullivan et al. |
| 2002/0140698 A1 | 10/2002 | Robertson et al. |
| 2002/0163482 A1 | 11/2002 | Sullivan |
| 2002/0174121 A1 | 11/2002 | Clemie |
| 2002/0176636 A1 | 11/2002 | Shefi |
| 2002/0180727 A1 | 12/2002 | Guckenberger et al. |
| 2002/0186221 A1 | 12/2002 | Bell |
| 2002/0190961 A1 | 12/2002 | Chen |
| 2003/0006943 A1 | 1/2003 | Sato et al. |
| 2003/0011535 A1 | 1/2003 | Kukuchi et al. |
| 2003/0085866 A1 | 5/2003 | Bimber et al. |
| 2003/0085896 A1 | 5/2003 | Freeman |
| 2003/0103139 A1 | 6/2003 | Pretzer et al. |
| 2003/0112328 A1 | 6/2003 | Yoon |
| 2003/0117396 A1 | 6/2003 | Yoon |
| 2003/0206653 A1 | 11/2003 | Katayama et al. |
| 2003/0227470 A1 | 12/2003 | Genc et al. |
| 2003/0231177 A1 | 12/2003 | Montagnese et al. |
| 2004/0037459 A1 | 2/2004 | Dodge |
| 2004/0066376 A1 | 4/2004 | Donath et al. |
| 2004/0066384 A1 | 4/2004 | Ohba |
| 2004/0125103 A1 | 7/2004 | Kaufman et al. |
| 2004/0130525 A1 | 7/2004 | Suchocki |
| 2004/0135744 A1 | 7/2004 | Bimber et al. |
| 2004/0135780 A1 | 7/2004 | Nims |
| 2004/0164956 A1 | 8/2004 | Yamaguchi et al. |
| 2004/0169649 A1 | 9/2004 | Suzuki |
| 2004/0169663 A1 * | 9/2004 | Bernier ........................ 345/629 |
| 2004/0169670 A1 | 9/2004 | Uehara et al. |
| 2004/0196359 A1 | 10/2004 | Blackham |
| 2004/0208358 A1 | 10/2004 | Tooyama et al. |
| 2004/0227703 A1 | 11/2004 | Lamvik et al. |
| 2004/0249303 A1 | 12/2004 | Serra |
| 2005/0024331 A1 | 2/2005 | Berkley et al. |
| 2005/0030308 A1 | 2/2005 | Takaki |
| 2005/0057579 A1 | 3/2005 | Young |
| 2005/0093859 A1 | 5/2005 | Sumanaweera et al. |
| 2005/0093876 A1 | 5/2005 | Snyder et al. |
| 2005/0151742 A1 | 7/2005 | Hong et al. |
| 2005/0156881 A1 | 7/2005 | Trent et al. |
| 2005/0162447 A1 | 7/2005 | Tiggs |
| 2005/0195276 A1 | 9/2005 | Lipton et al. |
| 2005/0219240 A1 | 10/2005 | Vesely et al. |
| 2005/0219693 A1 | 10/2005 | Hartkop et al. |
| 2005/0219694 A1 | 10/2005 | Vesely et al. |
| 2005/0219695 A1 | 10/2005 | Vesely et al. |
| 2005/0231532 A1 | 10/2005 | Suzuki et al. |
| 2005/0248566 A1 | 11/2005 | Vesely et al. |
| 2005/0264558 A1 | 12/2005 | Vesely et al. |
| 2005/0264559 A1 | 12/2005 | Vesely et al. |
| 2005/0264651 A1 | 12/2005 | Saishu et al. |
| 2005/0264857 A1 * | 12/2005 | Vesely et al. ................... 359/13 |
| 2005/0264858 A1 | 12/2005 | Vesely et al. |
| 2005/0275913 A1 | 12/2005 | Vesely et al. |
| 2005/0275914 A1 | 12/2005 | Vesely et al. |
| 2005/0275915 A1 | 12/2005 | Vesely et al. |
| 2005/0281411 A1 | 12/2005 | Vesely et al. |
| 2006/0126926 A1 | 6/2006 | Vesely et al. |
| 2006/0126927 A1 | 6/2006 | Vesely et al. |
| 2006/0170652 A1 | 8/2006 | Bannai et al. |
| 2006/0192780 A1 * | 8/2006 | Lantin ........................... 345/427 |
| 2006/0221071 A1 | 10/2006 | Vesely et al. |
| 2006/0227151 A1 | 10/2006 | Bannai |
| 2006/0250390 A1 | 11/2006 | Vesely et al. |
| 2006/0250391 A1 | 11/2006 | Vesely et al. |
| 2006/0250392 A1 | 11/2006 | Vesely et al. |
| 2006/0252978 A1 | 11/2006 | Vesely et al. |
| 2006/0252979 A1 | 11/2006 | Vesely et al. |
| 2007/0035511 A1 | 2/2007 | Banerjee et al. |
| 2007/0040905 A1 | 2/2007 | Vesely et al. |
| 2007/0043466 A1 | 2/2007 | Vesely et al. |
| 2007/0064018 A1 * | 3/2007 | Shoemaker et al. .......... 345/660 |

(56) References Cited

U.S. PATENT DOCUMENTS

2007/0109296 A1   5/2007   Sakagawa et al.
2009/0102841 A1*  4/2009   Clavadetscher ............... 345/420

OTHER PUBLICATIONS

Brown, Leonard D., and Hong Hua. "Magic lenses for augmented virtual environments." Computer Graphics and Applications, IEEE 26.4 (2006): 64-73.*

Masafumi Yamashita, Measurements of Temporal Changes of TN LC Molecular Alignments on Double Block Pulse Method, Japanese Journal of Applied Physics 27 (1988), pp. 1571-1576, Abstract, 1 page.

Xie, et al., "Reflective Bistable Twisted Nematic Liquid Crystal Display," Japanese Journal of Applied Physics, vol. 37 Pt.1, No. 5A, 1998, pp. 2572-2575.

Bin Wang and Philip J. Bos, "Bistable Twist Nematic Display d/p. Ratio Optimization," 1999, 6 pages.

H.A. van Sprang and H.G. Koopman, "Experimental and calculated results for the dynamics of oriented nematics with twist angles from 210 degrees to 270 degrees," Journal of Applied Physics, vol. 64, No. 10, Nov. 15, 1988, pp. 4873-4883.

N. J. Smith and M. D. Tillin, "Direct Optical Quantification of Backflow in a 90 degree Twisted Nematic Cell," Physical Review Letters, vol. 88, No. 8, Feb. 25, 2002, 4 pages.

Tie-Zheng Qian, et al., "Dynamic flow and switching bistability in twisted nematic liquid crystal cells," Applied Physics Letters, vol. 71, No. 5, Aug. 4, 1997, pp. 596-598.

J.P. Nicholson and S.B. Charnley, "Dynamic Response of Twisted Nematic Liquid Crystal Cells to Transiently Pulsed Fields," Optics Communications, vol. 40, No. 4, Jan. 15, 1982, pp. 283-287.

Lu, et al., "Variable optical attenuator based on polymer stabilized twisted nematic liquid crystal," Optics Express, vol. 12, No. 7, Apr. 5, 2004, pp. 1221-1227.

H. S. Kwok, T. Z. Qian, Z. L. Xie and P. Sheng, "Optical Properties of Bistable Twisted Nematic LCD and Its Switching Mechanisms," 1997, 4 pages.

Hoon Kim, Dong-Ho Lee and Woo-Sang Park, "Numerical analysis on the dynamical behavior of the TN and OCB modes including flow," Proc. of ASID'06, Oct. 8-12, pp. 179-182.

Jack Kelly, et al., "Simulation of the dynamics of twisted nematic devices including flow," Journal of Applied Physics, vol. 86, No. 8, Oct. 15, 1999, pp. 4091-4095.

Chul Gyu Jhun, et al., "Optical Bouncing in Bistable Chiral Splay Nematic Liquid Crystal Device," Japanese Journal of Applied Physics, vol. 45, No. 1A, 2006, pp. 128-132.

Robert L. Hubbard and Philip J. Bos, "Optical-Bounce Removal and Turnoff-Time Reduction in Twisted-Nematic Displays," IEEE, 1981, 3 pages.

Chen, et al., "The Optical Bounce Effect of the Chiral-Homeotropic Cell," ASID 1999, pp. 171-175.

Chen, et al., "Homeotropic liquid-crystal device with two metastable states," Applied Physics Letters, vol. 74, No. 25, Jun. 21, 1999, pp. 3779-3781.

Chen, et al., "Dynamics of twisted nematic liquid crystal pi-cells," Applied Physics Letters, vol. 80, No. 20, May 20, 2002, pp. 3721-3723.

Dwight W. Berreman, "Liquid-crystal twist cell dynamics with backflow," Journal of Applied Physics, vol. 46, No. 9, Sep. 1975, pp. 3746-3751.

Arthur L. Berman, "Basics of Stereoscopic Displays," Analyst, Insight Media, Dec. 2, 2008, 84 pages.

P.D. Berezin, et al., "Electrooptic switching in oriented liquid-crystal films," Soviet Journal of Quant. Electron., vol. 3, No. 1, 1973, pp. 78-79.

Official Action mailed Aug. 20, 2007 for U.S. Appl. No. 11/141,650; 22 pages.

Official Action mailed Feb. 23, 2007 for U.S. Appl. No. 11/141,650; 10 pages.

International Search Report and Written Opinion for Application No. PCT/US2006/17597, mailed Sep. 20, 2006. 7 pages.

William Bares, Scott McDermott, Christina Boudreaux, and Somying Thainimit; "Virtual 3D Camera Composition from Frame Contraints"; University of Louisiana at Lafayette; 2000; 10 pages.

Maneesh Agrawala, Andrew C. Beers, Bernd Frohlich, Pat Hanrahan; "The Two-User Responsive Workbench: Support for Collaboration Through Individual Views of a Shared Space"; Proceedings of the 24th Annual Conference on Computer Graphics and Interactive Techniques; 1997; 6 pages.

Arvo; "Responsive Workbench: Algorithms and Methodologies"; California Institute of Technology; Aug. 1998; Retrieved from the Internet: <http://www.gg.caltech.edu/workbench/intro.html; 4 pages.

Paul Beardsley; Important Concepts from Projective Geometry; University of Edinburgh; Jan. 1995; 16 pages.

Lawrence D. Cutler, Bernd Frohlich, Pat Hanrahan; "Two-Handed Direct Manipulation on the Responsive Workbench"; Proceedings of the 1997 Symposium on Interactive 3D Graphics, ACM; 1997; 9 pages.

Bernd Frohlich, Henrik Tramberend; Andrew Beers, Maneesh Agrawala, David Baraff; "Physically-Based Manipulation on the Responsive Workbench"; Proceedings, IEEE, Jan. 2000, 7 pages.

Bernd Frohlich, Gernoth Grunst, Wolfgang Kruger, Gerold Wesche; "The Responsive Workbench: A Virtual Working Environment for Physicians"; Computers in Biology and Medicine, Elsevier Science, Mar. 1995, vol. 25, No. 2; pp. 301-308.

Bernd Frohlich; (stills from video) "Physically-based Manipulation on the Responsive Workbench"; Stanford University, Jan. 2000; 12 pages.

Arthur N. Girling; "Stereoscopic Drawings: A Theory of 3-D Vision and Its Application to Stereoscopic Drawing"; 1990, Free Standing Projection, Chap. 2; 12 pages.

Pat Hanrahan, Bernd Froehlich, Wolfgang Krueger, Maneesh Agrawala, Andrew Beers, Larry Cutler, Cary Kornfeld; "The Responsive Workbench"; Stanford University, Nov. 1996; 23 pages.

Steve Hughes; "An Introduction to Making Phantograms"; Jul. 7-12, 2004; 60 pages.

International Search Report for Application No. PCT/US2005/11252, mailed May 30, 2006. 11 pages.

International Search Report for Application No. PCT/US2005/11253, mailed Jun. 2, 2006. 9 pages.

International Search Report for Application No. PCT/US2005/11254, mailed Mar. 26, 2007. 10 pages.

International Search Report for Application No. PCT/US2005/11255, mailed Mar. 2, 2006. 9 pages.

International Search Report for Application No. PCT/US2005/19068, mailed Feb. 27, 2006. 8 pages.

International Search Report for Application No. PCT/US2005/19069, mailed Feb. 22, 2006. 9 pages.

International Search Report for Application No. PCT/US2005/47659, mailed Dec. 4, 2006. 6 pages.

International Search Report for Application No. PCT/US2006/17596, mailed Nov. 28, 2006. 11 pages.

International Search Report for Application No. PCT/US2006/17598, mailed Apr. 26, 2007. 8 pages.

Vesely; "Aspects of the IZ User Interface Shown in Prior Demos"; Infinite Z, 2003; 10 pages.

U.S. Appl. No. 11/724,523, entitled "Horizontal Perspective Polarizing Media", by Michael A. Vesely and Nancy L. Clemens, filed on Mar. 14, 2007. 42 pages.

U.S. Appl. No. 11/724,524, entitled "Shifted Pixel Polarized Stereoscopic Display", by Michael A. Vesely and Nancy L. Clemens, filed on Mar. 14, 2007. 45 pages.

U.S. Appl. No. 11/724,525, entitled "Composite Pointer for Stereoscopic Simulation", by Michael A. Vesely and Nancy L. Clemens, filed on Mar. 14, 2007. 27 pages.

* cited by examiner

PRESENTING A VIEW WITHIN A THREE DIMENSIONAL SCENE

PRIORITY INFORMATION

This application claims benefit of priority of U.S. provisional application Ser. No. 61/299,538 titled "Stereo Multiview Device", filed Jan. 29, 2010, whose inventor is Michael Vesely, which is hereby incorporated by reference in its entirety as though fully and completely set forth herein.

FIELD OF THE INVENTION

The present invention relates to the field of three dimensional graphics, and more particularly to a system and method for presenting a view within a three dimensional scene.

DESCRIPTION OF THE RELATED ART

Three dimensional (3D) capable computing devices and real-time computer-generated 3D computer graphics have been a popular area of computer science for the past few decades, with innovations in visual, audio and tactile systems. Much of the research in this area has produced hardware and software products that are specifically designed to generate greater realism and more natural computer-human interfaces. These innovations have significantly enhanced and simplified the user's computing experience.

However, additional tools and improvements to the realm of 3D systems are desired.

SUMMARY OF THE INVENTION

Various embodiments are presented of a system and method for presenting a view based on a virtual viewpoint within a 3D scene.

A 3D scene may be presented by at least one display. More particularly, one or more stereoscopic images of the 3D scene may be presented by the display(s), e.g., by one or more stereoscopic displays. The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that user can view the 3D scene with minimal distortions (e.g., since it is based on the eyepoint of the user).

As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form the 3D scene. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, as indicated above, at least a portion of the 3D scene may appear as a hologram above the surface of the display. Thus, the user can directly interact with objects (displayed virtual objects) in the open space because they co-inhabit physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly manipulated by hands or hand-held tools. That is, objects displayed within the inner volume may be manipulated indirectly, e.g., via a computer mouse or a joystick.

The method may further include determining a virtual viewpoint within the 3D scene, where the virtual viewpoint is different than the first viewpoint. For example, the virtual viewpoint within the 3D scene may be selected or otherwise specified by a user, e.g., the user viewing the 3D scene. In one embodiment, the user may manipulate a handheld device, such as a stylus, to specify the virtual viewpoint within the 3D scene. For example, the user may use the handheld device to specify a viewpoint within the 3D scene by positioning the handheld device in the open space of the presented 3D scene. Thus, the user input may be "open space user input" to specify the virtual viewpoint.

The virtual viewpoint may be the viewpoint or perspective of a virtual object displayed in the 3D scene. For example, a virtual camera may be displayed in the 3D scene, and the user may be able to manipulate the virtual camera in the 3D scene (e.g., using a stylus in open space as indicated above) to specify the virtual viewpoint within the 3D scene. Alternatively, or additionally, the virtual object may be a magnifying glass or other type of tool or displayed object. In further embodiments, the virtual object may be a character or entity in the scene (e.g., a person or bird flying through the 3D scene) and the virtual viewpoint may correspond to the eyepoint of the virtual entity within the 3D scene.

In addition to determining the virtual viewpoint, a field of view of the virtual viewpoint may be determined. For example, the field of view may be a wide angle field of view (e.g., corresponding to a wide angle lens of a virtual camera) or a telescopic field of view (e.g., corresponding to a telescopic lens of a virtual camera). Additionally, a magnification for the virtual viewpoint may be determined. The field of view and/or magnification may be determined based solely on the virtual viewpoint, or may be determined based on other factors, e.g., user input. For example, the user may specify a telescopic lens or a wide angle lens. The user may also be able to select or specify a specific magnification (e.g., of the telescopic lens). Thus, in some embodiments, the field of view and/or magnification may be determined based on user input.

In some embodiments, the 3D scene may indicate the virtual viewpoint. For example, the displayed 3D scene may illustrate the frustum of the view of the 3D scene within the 3D scene. As one particular example, the virtual camera object displayed in the 3D scene may also indicate the frustum of view of the virtual object within the 3D scene.

A view of the 3D scene may be presented on the at least one display according to the virtual viewpoint. Said another way, the view of the 3D scene may be rendered from the perspective of the virtual viewpoint specified above. Note that the view of the 3D scene may be presented concurrently with the presentation of the 3D scene. Where the field of view and/or magnification is determined above, the presentation of the view of the 3D scene may be based on the determined (or specified) field of view and/or magnification. For example, if a magnification is specified, the view of the 3D scene may be magnified at that corresponding magnification. Thus, the view of the 3D scene may be magnified compared to a corresponding portion of the 3D scene.

The view of the 3D scene may also be based on the first viewpoint (that corresponds to the eyepoint of the user). For example, the view of the 3D scene may be presented such that it is easy to see based on the first viewpoint (e.g., where it is perpendicular to the line of sight of the user viewing the 3D scene). The view of the 3D scene may be presented in any number of ways. For example, the view of the 3D scene may be monoscopic or stereoscopic, as desired.

Additionally, the view of the 3D scene may be presented on the same display as the 3D scene or on different displays. For example, the view of the 3D scene may be presented within the 3D scene. In other words, the view of the 3D scene may be presented on the same display, or on the same plurality of displays, which are used to present the 3D scene itself. Alternatively, or additionally, the view of the 3D scene may be provided on a separate display, e.g., which is dedicated to the view of the 3D scene. Thus, in one embodiment, the at least one display (which is used to present the 3D scene and the view of the 3D scene) may include a first one or more displays and a second one or more displays, and the 3D scene may be provided via the first one or more displays and the view of the 3D scene may be presented via the second one or more displays.

Additionally, the view of the 3D scene may be presented at a position and orientation which differs from that of the display providing the view of the 3D scene. For example, the display may have a horizontal position and the view of the 3D scene may be presented on a virtual display which faces (or is perpendicular to) the eyepoint of the user viewing the 3D scene. The view of the 3D scene (or virtual display) may be positioned in open space of the 3D scene, e.g., in open space relative to the display providing the view of the 3D scene.

The method may further include moving the virtual viewpoint, e.g., in response to user input. The movement of the virtual viewpoint may be performed similarly to the specification of the virtual viewpoint described above. For example, the user may select the virtual object specifying the virtual viewpoint (e.g., the virtual camera object) and may change the position and/or orientation of the virtual object in the 3D scene to move the virtual viewpoint from an original position and/or orientation to a second position and/or orientation.

The movement of the virtual viewpoint may be discrete (e.g., immediately from the original to the second) or may be a continuous movement. In either case, the view of the 3D scene may be updated according to the movement, e.g., discretely or smoothly. In the continuous movement, the 3D scene may show the continuous change in viewpoint from the original viewpoint to the finally specified viewpoint. Thus, the determination of a virtual viewpoint and the presentation of the view of the 3D scene may be performed a plurality of times throughout presentation of the 3D scene, and in particular, throughout movement or change of the virtual viewpoint.

The presentation of the view of the 3D scene may be performed at a frame rate or quality which is comparable to the presentation of the 3D scene. Additionally, or alternatively, the view of the 3D scene may be provided at a frame rate or quality which is above a certain threshold. This quality or speed may ensure that the view of the 3D scene is provided in a smooth manner, e.g., at a rate where the user does not notice movement artifacts in the view of the 3D scene, such as choppiness or glitching. This quality of presentation may apply when the virtual viewpoint is static (e.g., when objects are moving within the view of the 3D scene) or when the virtual viewpoint is being moved (e.g., the movement of the virtual viewpoint described above).

The 3D scene may be updated based on changes of the first viewpoint (e.g., corresponding to changes of the eyepoint of a user). For example, the user may move his head, thereby changing the location of his eyepoint. Accordingly, a next viewpoint (which corresponds to the user's new eyepoint) may be determined after displaying the 3D scene and the view of the 3D scene. Based on this next viewpoint, the 3D scene may be updated and an updated stereoscopic image of the 3D scene may be provided by the display(s). Where the view of the 3D scene is also based on the viewpoint corresponding to the eyepoint of the user, the view of the 3D scene may be correspondingly updated as well.

BRIEF DESCRIPTION OF THE DRAWINGS

A better understanding of the present invention can be obtained when the following detailed description of the preferred embodiment is considered in conjunction with the following drawings, in which.

Figure 1:
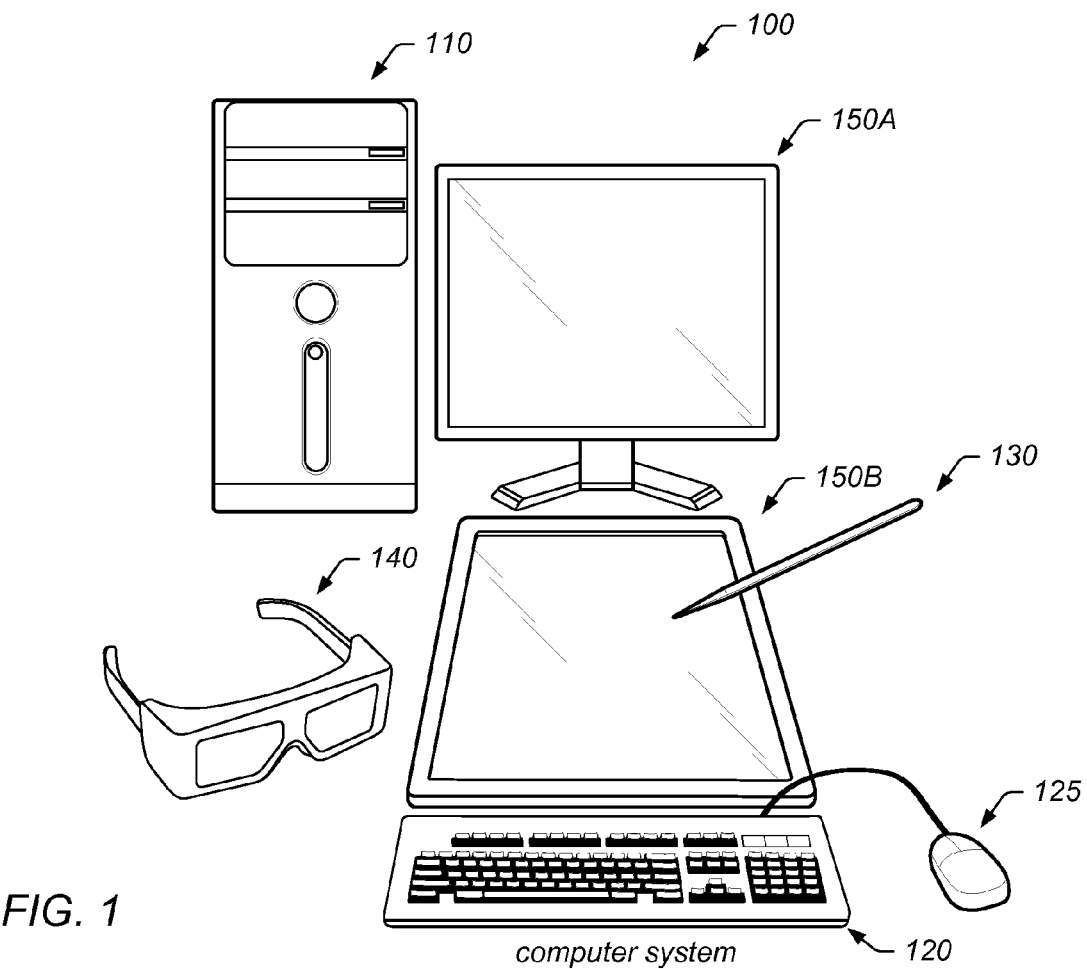
FIGS. 1 and 2 illustrate exemplary systems configured to implement various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

Terms

The following is a glossary of terms used in the present application:

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Figure 2:
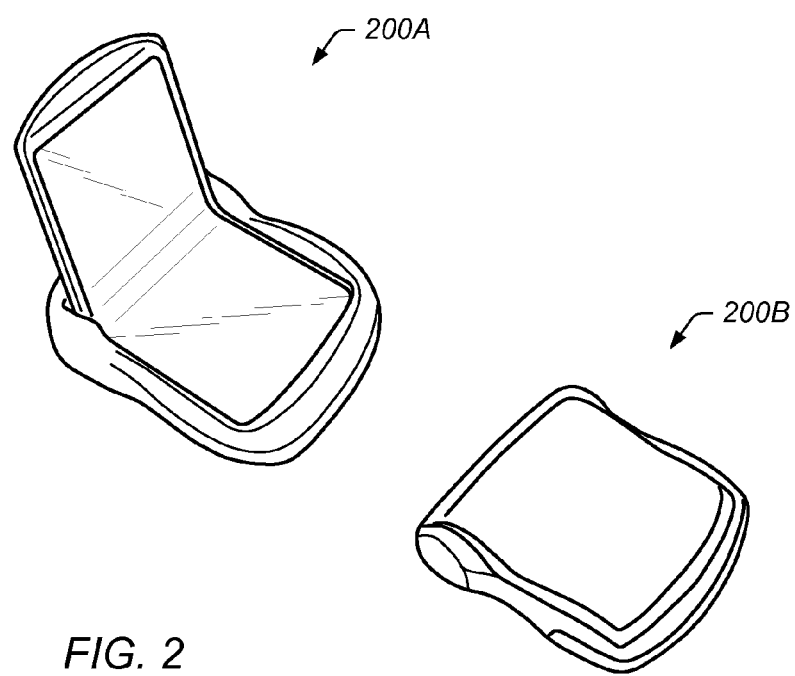

FIGS. 1 and 2—Exemplary Systems

FIGS. 1 and 2 illustrate exemplary systems which are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, and glasses 140. In one embodiment, at least one of the displays 150A and 150B is a stereoscopic display. For example, in one embodiment, both of the displays 150A and 150B are stereoscopic displays.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform the methods described herein. The memory medium may also store data (e.g., a computer model) representing a virtual space, which may be used for projecting a 3D scene of the virtual space via the display(s) 150. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images) using the display 150A and/or the display 150B. The computer system 100 may also be configured to display a "view" of the 3D scene using the display 150A, the display 150B, and/or another display, as described in more detail below. The "view" of the 3D scene may refer to displaying a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided in more detail below. Additionally, while the displays 150 are shown as flat panel displays, they may be any type of system which is capable of displaying images, e.g., projection systems.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear the glasses 140. The glasses 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the display(s) 150. The display may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the glasses 140 may be used as a position input device to track the eyepoint of a user viewing a 3D scene presented by the system 100. For example, the glasses 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as a camera (e.g., a CCD camera) providing position data suitable for the head tracking objectives of the invention. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with minimal distortions (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694).

One or more of the user input devices (e.g., the keyboard 120, the mouse 125, the stylus 130, etc.) may be used to interact with the presented 3D scene. For example, the user input device 130 (shown as a stylus) or simply the user's hands may be used to directly interact with virtual objects of the 3D scene (via the viewed projected objects). However, this direct interaction may only be possible with "open space" portions of the 3D scene. Thus, at least a portion of the 3D scene may be presented in this "open space", which is in front of or otherwise outside of (e.g., behind) the at least one display. Thus, at least a portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). This "open space" may be referred to as a "hands-on volume" as opposed to an "inner-volume", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools. That is, they may be manipulated indirectly, e.g., via a computer mouse or a joystick.

In some embodiments, this open space interaction may be achieved by having a 1:1 correspondence between the virtual objects (e.g., in the virtual space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence is a new computing concept that may allow the user to physically and directly access and interact with projected objects of the 3D scene. This new concept requires the creation of a common physical reference plane, as well as, the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As described below, the user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired. More details regarding the view of the 3D scene are provided below.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or the glasses 140) to ensure synchronization between the peripheral device and the displayed image. The system can further include a calibration unit to ensure the proper mapping of the peripheral device to the display images and proper mapping between the projected images and the virtual images stored in the memory of the chassis 110.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with in real time. The system may comprise real time electronic display(s) 150 that can present or convey perspective images in the open space and a peripheral device 130 that may allow the user to interact with the 3D scene with hand controlled or hand-held tools. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as 200A and 200B. In this embodiment, the system may be a foldable and/or portable system (e.g., similar to a laptop or tablet computer) where the user may have the system 200 open (as shown in 200A) or closed (as shown in 200B). In this embodiment, the horizontal display and vertical display may be blended by a blending display. Thus, the display of the system 200 may be thought of as a plurality of combined displays, or a single display which is able to project horizontally and/or vertically, as desired.

Exemplary Systems

Embodiments of the present invention may augment the current state of real-time computer-generated 3D computer graphics and tactile computer-human interfaces with real time interaction. More specifically, these new embodiments may enable real-time computer-generated 3D simulations to coexist in physical space and time with the user interacting with the projected objects. This unique ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3A:
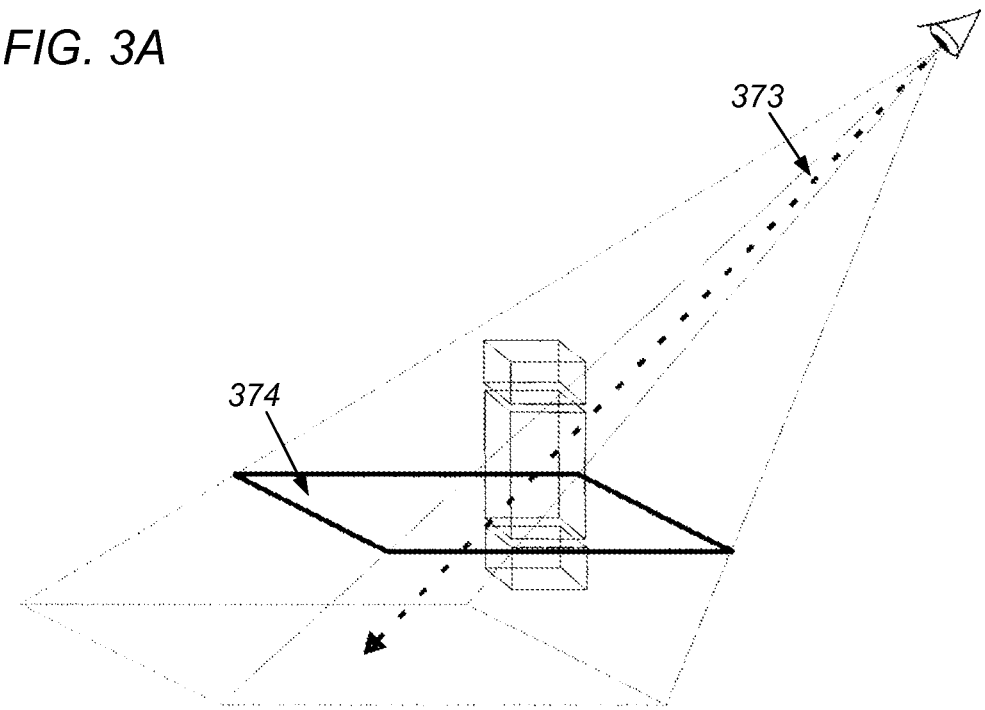
FIGS. 3A and 3B illustrate exemplary horizontal and vertical perspective projections, according to some embodiments.
Figure 3B:
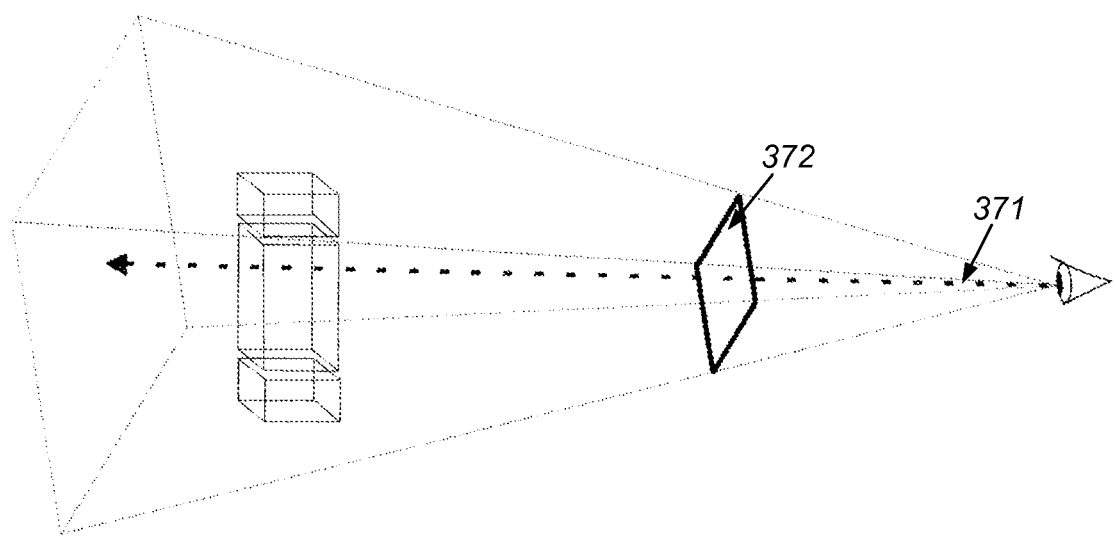

FIGS. 3A and 3B—Horizontal and Vertical Perspective

FIG. 3A illustrates an exemplary diagram of a horizontal perspective projection and FIG. 3B illustrates an exemplary diagram of a vertical perspective projection.

In the horizontal perspective of FIG. 3A, the projected image is not on the plane of vision—instead, it is on a plane angled to the plane of vision. Typically, the image would be on the ground level surface. This means the image will be physically in the third dimension relative to the plane of vision. As indicated above, it may be desirable or important that the image is viewed from the correct eyepoint, otherwise the 3D scene may not represent a physical truism.

In FIG. 3A, the object was drawn by the artist closing one eye, and viewing along a line of sight 373 45° to the horizontal display plane 374. The resulting image, when viewed horizontally at the eyepoint, (in this case, for a single image at 45° and through one eye) looks the same as the original image. In FIG. 3B, the object in the 3D scene (three blocks stacked slightly above each other) was drawn by the artist closing one eye, and viewing along a line of sight 371 perpendicular to the vertical display plane 372. The resulting image, when viewed vertically, straight on, and through one eye, looks the same as the original image.

As can be seen, one major difference between vertical (e.g., central) perspective showing in FIG. 3B and horizontal perspective in FIG. 3A is the location of the display plane (374 and 372) with respect to the projected 3D image. In the horizontal perspective of FIG. 3A, the display plane can be adjusted up and down, and therefore the projected image can be conveyed in the open air above the display plane, e.g., a user can touch (or more likely pass through) the illusion, or it can be displayed under the display plane, e.g., a user cannot touch the illusion because the display plane physically blocks the hand. This is the nature of horizontal perspective, and as long as the rendering viewpoint and the user's eyepoint are at the same place, the illusion is present. In contrast, for the single eye vertical (e.g., central) perspective of FIG. 3B, the 3D illusion is likely to be only inside the display plane, meaning one cannot touch it. However, using stereoscopic images, both perspectives can convey the 3D scene in "open space".

Figure 4A:
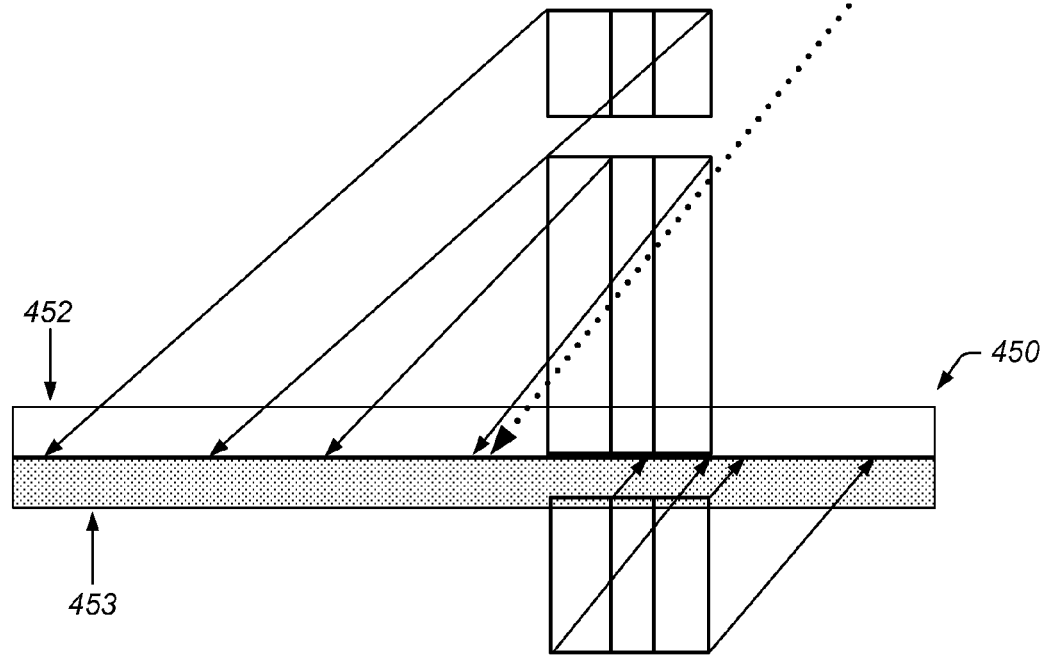
FIGS. 4A and 4B illustrate an exemplary horizontal display with a corresponding horizontal projection, according to some embodiments.
Figure 4B:
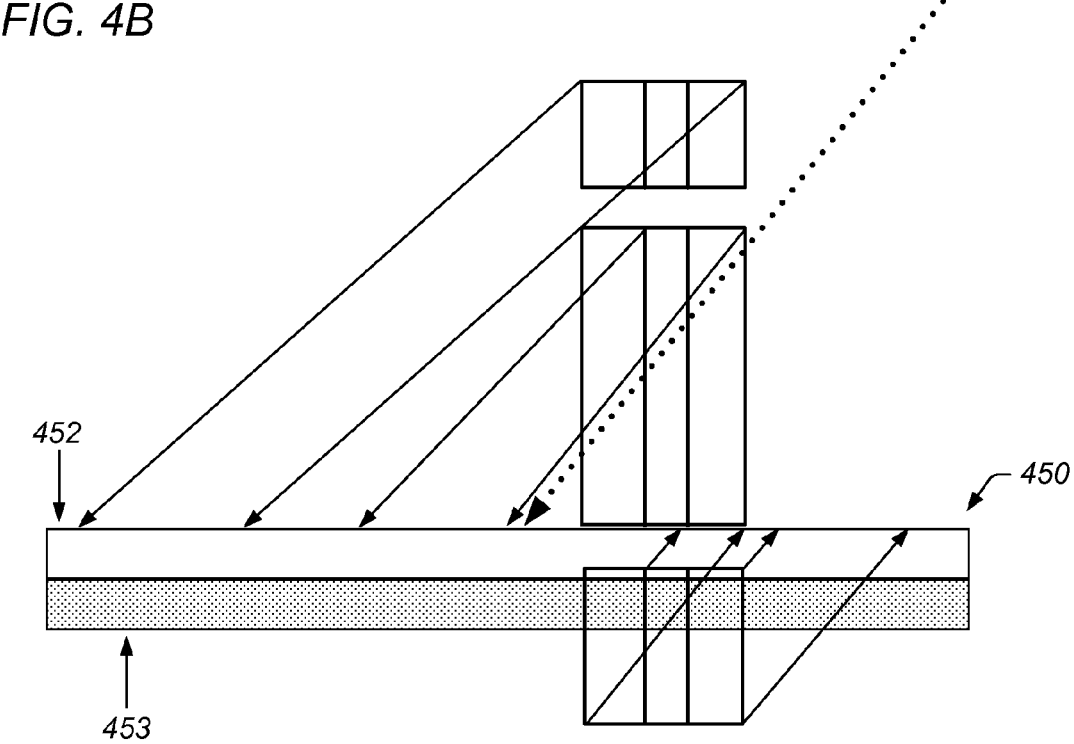

FIGS. 4A and 4B—Display Adjustment for Horizontal Perspective

The display(s) 150 may be made of many physical layers, individually and together having thickness or depth. To illustrate this, FIGS. 4A and 4B illustrate a conceptual side-view of a typical LCD display 450 (an embodiment of one or more of the displays 150). FIGS. 4A and 4B also illustrate how the projected 3D scene can include a portion in open space and another portion in the inner volume.

The top layer of the display 450 is the physical "view surface" 452, and the imaging layer (liquid crystal layer), where images are made, is the physical "image layer" 453. The view surface 452 and the image layer 453 are separate physical layers located at different depths or z coordinates along the viewing device's z axis. To display an image, the LCD's polarized light is provided from the image layer 453 through the view surface 452 (which may be glass).

In the example shown in FIGS. 4A and 4B, the same blocks from 3A and 3B are shown with a horizontal perspective. As shown, the middle block in FIG. 4A does not correctly appear on the view surface 452. In FIG. 4A, the imaging layer, i.e. where the image is made, is located behind the view surface 452. Therefore, the bottom of the middle block is incorrectly positioned behind or underneath the view surface 452.

FIG. 4B illustrates an example of the proper location of the three blocks on the display 450. That is, the bottom of the middle block is displayed correctly on the view surface 452 and not on the image layer 453. To make this adjustment, the z coordinates of the view surface 452 and image layer 453 are used by the 3D scene generator to correctly render the image. Thus, the unique task of correctly rendering an open space image on the view surface 452 versus the image layer 453 may be critical in accurately mapping the 3D scene objects to the physical projected space.

Thus, the display's view surface 452 is the correct physical location to demarcate the division between open space and inner space and hence image rendering must use this view surface thickness as an offset when intending to render scenes where the object is to be fully conveyed in open space. Therefore, the top of the display's view surface 452 is the common physical reference plane. However, only a subset of the view surface 452 can be the reference plane because the entire view surface may be larger than the total image area.

Many viewing devices enable the end user to adjust the size of the image area within the viewing region of the viewing devices by adjusting certain x and y values. But all three, x, y, z, coordinates are essential to determine the location and size of the common physical reference plane. The formula for this is: The image layer 453 is given a z coordinate of 0. The view surface is the distance along the z axis from the image layer 453. The reference plane's z coordinate is equal to the view surface 452, i.e. its distance from the image layer 453. The x and y coordinates, or size of the reference plane, can be determined by displaying a complete image on the viewing device and measuring the length of its x and y axis.

The concept of the common physical reference plane is not common. Therefore, display manufactures may not supply its coordinates. Thus a "reference plane calibration" procedure might need to be performed to establish the reference plane coordinates for a given display surface. This calibration procedure may provide the user with a number of orchestrated images with which he interacts. The user's response to these images provides feedback to the 3D scene generator such that it can identify the correct size and location of the reference plane. In one embodiment, when the end user is satisfied and completes the procedure the coordinates are saved in the end user's personal profile. With some displays, the distance between the view surface 452 and image layer 453 is quite small. But no matter how small or large the distance, it is critical that all Reference Plane x, y, and z coordinates are determined as close as technically possible within certain tolerance, e.g., optimally less than a quarter inch.

After the mapping of the "computer-generated" horizontal perspective projection display plane to the "physical" reference plane x, y, z coordinates, the two elements are essentially coincident in space; that is, the computer-generated horizontal plane now shares the real-world or physical x, y, z coordinates of the physical reference plane.

Figure 5A:
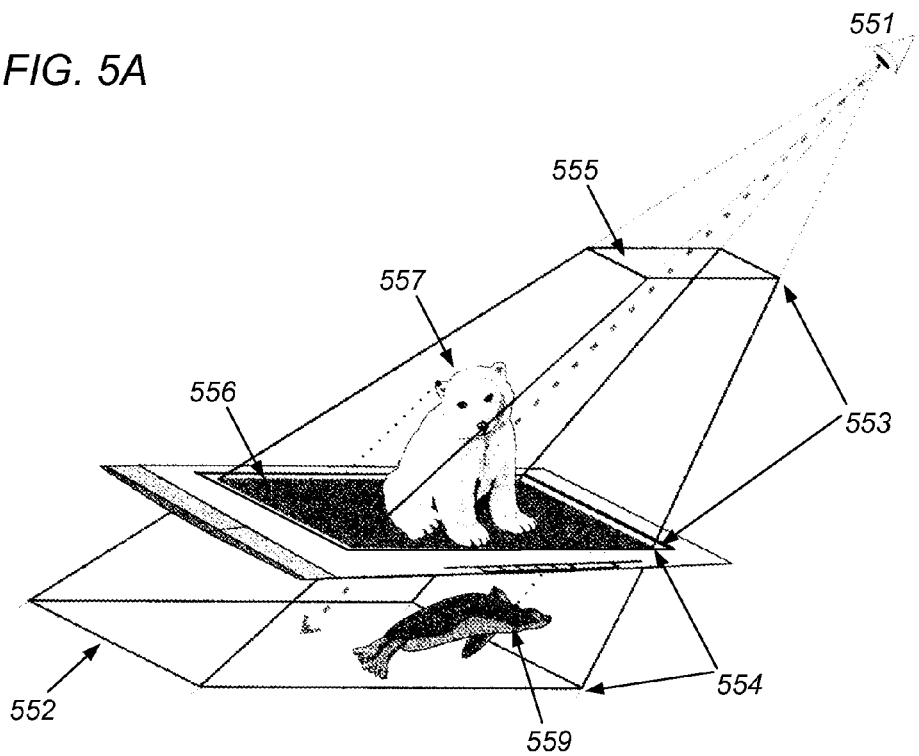
FIGS. 5A and 5B illustrate exemplary view volumes of a horizontal projection, according to some embodiments.
Figure 5B:
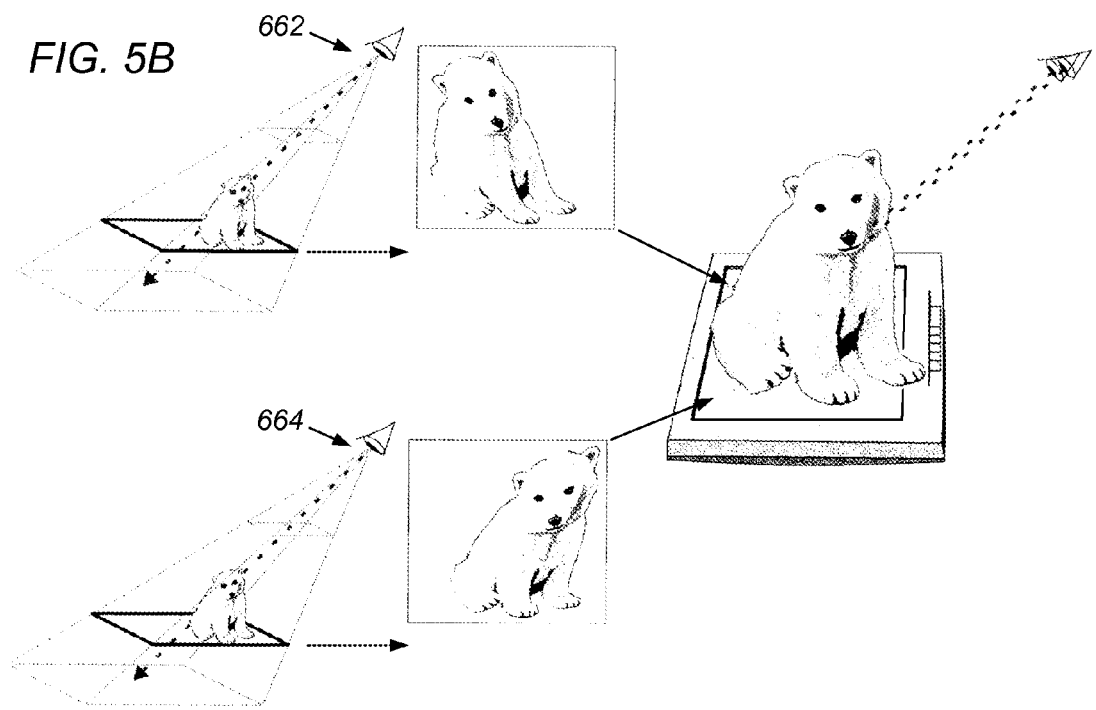

FIGS. 5A and 5B—Exemplary Mono and Stereo View Volumes in Horizontal Perspective FIGS. 3A and 3B illustrate "view volumes" of the horizontal and vertical perspectives, respectively, for a single eye. FIG. 5A illustrates a more detailed single eye view volume in a horizontal perspective, and FIG. 5B illustrates the view volumes of a stereoscopic image.

Mathematically, the computer-generated x, y, z coordinates of the viewpoint (e.g., corresponding to a user's eyepoint) form the vertex of an infinite pyramid, whose sides pass through the x, y, z coordinates of the reference/horizontal plane. FIG. 5A illustrates this infinite pyramid, which begins at the viewpoint 551 and extends through the far clip plane (not shown). There are new planes within the pyramid that run parallel to the reference/horizontal plane 556, which, together with the sides of the pyramid, define two new volumes. These unique volumes are called open space volume 553 and the inner volume 554, which were described previously. As shown, the open space volume 553 may exist within the pyramid between and inclusive of the comfort plane 555 and the reference/horizontal plane 556. As indicated above, in one embodiment, a user cannot directly interact with 3D objects located within the inner volume 554 via his hand or hand held tools (such as the stylus 130), but they can interact in the traditional sense with a computer mouse, joystick, or other similar computer peripheral. The plane 556 along with the bottom plane 552, are two of the planes within the pyramid that define the inner volume 554. Note that while the bottom plane 552 is farthest away from the viewpoint 551, it is not to be mistaken for the far clip plane.

FIG. 5A also illustrates a plane 555, called the comfort plane. The comfort plane 555 is one of six planes that define the open space volume 553, and of these planes it is closest to the viewpoint 551 and parallel to the reference plane 556. The comfort plane (or near plane) 555 is appropriately named because its location within the pyramid determines the user's personal comfort, e.g., how his eyes, head, body, etc. are situated while viewing and interacting with simulations. The user can adjust the location of the comfort plane 555 based on his personal visual comfort through a "comfort plane adjustment" procedure, where the user can adjust the position or closeness of the plane 555. This procedure may provide the user with various 3D scenes within the open space volume 553 and may enable him to adjust the location of the comfort plane 555 within the pyramid relative to the reference plane 556. When the user is satisfied and completes the procedure, the location of the comfort plane 555 may be saved in the user's personal profiles. Other planes, such as the bottom plane may be adjusted similarly.

FIG. 5B illustrates the provision of a stereoscopic image to two single viewpoints (corresponding to two eyes) viewing the 3D scene of the polar bear. As shown, viewpoint 662 may correspond to a user's right eyepoint and viewpoint 664 may correspond to a user's left eyepoint. By rendering and presenting a stereoscopic image according to these single viewpoints, a 3D scene of the polar bear may be provided to the user, e.g., using the glasses 140 as described above.

Figure 6:
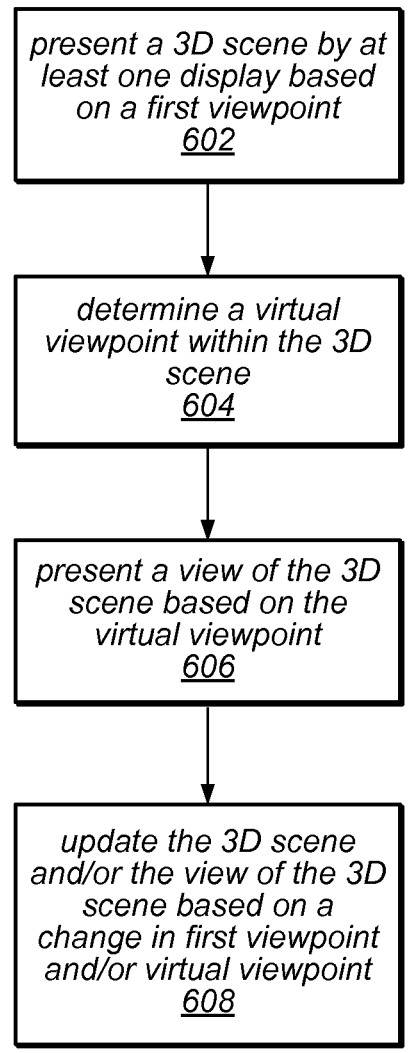
FIG. 6 is a flowchart diagram illustrating one embodiment of a method for presenting a view of a 3D scene based on a virtual viewpoint.

FIG. 6—Presenting a View Based on a Virtual Viewpoint Within a 3D Scene

FIG. 6 illustrates a method for presenting a view based on a virtual viewpoint within a 3D scene. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a 3D scene may be presented by at least one display (e.g., the display(s) 150). More particularly, one or more stereoscopic images of the 3D scene may be presented by the display(s). The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that the user can view the 3D scene with minimal distortions (e.g., since it is based on the eyepoint of the user). More specifically, when the 3D scene is based on the user's eyepoint, the 3D scene is rendered based on the perspective as would be seen by the viewer. This rendering avoids much of the distortion that would be conveyed if the viewpoint of the scene did not match the eyepoint of the viewer. In other words, a displayed object retains the correct perspective as perceived by the viewer as long as the viewer eyepoint and 3D scene viewpoint remain in correspondence As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form or convey the 3D scene to the user. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, at least a portion of the 3D scene may appear as a hologram above the display surface. For example, when a horizontal display is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact (e.g., where the user is able to place his hands in the space) rather than a space the user cannot freely move nor interact (e.g., where the user is not able to place his hands in the space, such as below the display surface). This "open space" may be referred to as a "hands-on volume" as opposed to an "inner-volume", which may be under the surface of the display(s). Thus, the user can directly interact with objects (displayed virtual objects) in the open space because they co-inhabit the physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly, physically manipulated by hands or hand-held tools. That is, objects displayed within the inner volume may be manipulated indirectly, e.g., via a computer mouse or a joystick.

In 604, a virtual viewpoint within the 3D scene may be determined, where the virtual viewpoint is different than the first viewpoint. For example, the virtual viewpoint within the 3D scene may be selected or otherwise specified by a user, e.g., the user viewing the 3D scene. In one embodiment, the user may manipulate a handheld device, such as a stylus, to specify the virtual viewpoint within the 3D scene. For example, the user may use the handheld device to specify a corresponding virtual viewpoint within the 3D scene by positioning the handheld device in the open space of the presented 3D scene. Thus, the user input may be "open space user input" to specify the virtual viewpoint.

The virtual viewpoint may be the viewpoint of a virtual object displayed in the 3D scene. For example, a virtual camera object may be one of many virtual objects rendered and conveyed within the 3D scene, and the user may be able to manipulate the virtual camera object (e.g., an object that resembles a camera) in the 3D scene (e.g., using a stylus in open space as indicated above) by positioning and/or orienting the stylus to specify the virtual viewpoint of the virtual camera object within the 3D scene. Alternatively, or additionally, the virtual object may be a magnifying glass (e.g., an object resembling a magnifying glass) or other type of tool or displayed virtual object. In further embodiments, the virtual object may be an avatar or entity in the scene (e.g., a person or bird flying through the 3D scene) and the virtual viewpoint may correspond to an eyepoint of the virtual entity within the 3D scene.

In addition to determining the virtual viewpoint, a field of view of the virtual viewpoint may be determined. For example, the field of view may be a wide angle field of view (e.g., corresponding to a wide angle lens of a virtual camera object) or a telescopic field of view (e.g., corresponding to a telescopic lens of a virtual camera object). Additionally, a magnification for the virtual viewpoint may be determined. The field of view and/or magnification may be determined based solely on the virtual viewpoint, or may be determined based on other factors, e.g., user input. For example, the user may specify a telescopic lens or a wide angle lens. The user may also be able to select or specify a specific magnification (e.g., of the telescopic lens). Thus, in some embodiments, the field of view and/or magnification may be determined based on user input. Further the view volume of the virtual viewpoint may be determined, e.g., automatically or based on user input. More specifically, the near and far clip planes of the virtual viewpoint volume may be determined, and the view of the 3D scene may be presented based on this determined view volume.

In some embodiments, the 3D scene may indicate the virtual viewpoint. For example, the displayed 3D scene may illustrate the frustum of the view of the 3D scene within the 3D scene. In one particular example, the virtual camera object displayed in the 3D scene may also indicate the frustum of view of the virtual object within the 3D scene.

In 606, a view of the 3D scene may be presented on the at least one display according to the virtual viewpoint. Said another way, the view of the 3D scene may be rendered from the perspective of the virtual viewpoint specified above. Note that the view of the 3D scene may be presented concurrently with the presentation of the 3D scene. Where the field of view and/or magnification is determined above, the presentation of the view of the 3D scene may be based on the determined (or specified) field of view and/or magnification. For example, if a magnification is specified, the view of the 3D scene may be magnified at that corresponding magnification. Thus, the view of the 3D scene may be magnified compared to a corresponding portion of the 3D scene.

The presentation of the view of the 3D scene may also be based on the first viewpoint (that corresponds to the eyepoint of the user). For example, the view of the 3D scene may be presented such that it is easy to see based on the first viewpoint (e.g., where it is perpendicular to the line of sight of the user viewing the 3D scene).

The view of the 3D scene may be presented in any number of ways. For example, the view of the 3D scene may be monoscopic or stereoscopic, as desired. Additionally, the view of the 3D scene may be presented on the same display as the 3D scene or on different displays. For example, the view of the 3D scene may be presented within the 3D scene. In other words, the view of the 3D scene may be presented on the same display, or on the same plurality of displays, which are used to present the 3D scene itself. Alternatively, or additionally, the view of the 3D scene may be provided on a separate display, e.g., which is dedicated to the view of the 3D scene. Thus, in one embodiment, the at least one display (which is used to present the 3D scene and the view of the 3D scene) may include a first one or more displays and a second one or more displays, and the 3D scene may be provided via the first one or more displays and the view of the 3D scene may be presented via the second one or more displays.

Additionally, the view of the 3D scene may be presented at a position and orientation which differs from that of the display providing the view of the 3D scene. For example, the display may have a horizontal position and the view of the 3D scene may be presented on a virtual display which faces (or is perpendicular to) the eyepoint of the user viewing the 3D scene. The view of the 3D scene (or virtual display) may be positioned in open space of the 3D scene, e.g., in open space relative to the display providing the view of the 3D scene.

In 608, the 3D scene and/or the view of the 3D scene may be updated based on a change in the first viewpoint and/or a change in the virtual viewpoint.

For example, the method may further include moving the virtual viewpoint, e.g., in response to user input. The movement of the virtual viewpoint may be performed similarly to the specification of the virtual viewpoint described above. For example, the user may select the virtual object specifying the virtual viewpoint (e.g., the virtual camera object) and may change the position and/or orientation of the virtual object in the 3D scene to move the virtual viewpoint from an original position and/or orientation to a second position and/or orientation.

The movement of the virtual viewpoint may be discrete (e.g., immediately from the original to the second) or may be a continuous movement. In either case, the view of the 3D scene may be updated according to the movement, e.g., discretely or smoothly. In the continuous movement, the 3D scene may show the continuous change in viewpoint from the original viewpoint to the finally specified viewpoint. Thus, the determination of a virtual viewpoint (504) and the presentation of the view of the 3D scene (506) may be performed a plurality of times throughout presentation of the 3D scene, and in particular, throughout movement or change of the virtual viewpoint.

The presentation of the view of the 3D scene may be performed at a frame rate or quality which is comparable to the presentation of the 3D scene. Additionally, or alternatively, the view of the 3D scene may be provided at a frame rate or quality which is above a certain threshold. This quality or speed may ensure that the view of the 3D scene is provided in a smooth manner, e.g., at a rate where the user does not notice movement artifacts in the view of the 3D scene, such as choppiness or glitching. This quality of presentation may apply when the virtual viewpoint is static (e.g., when objects are moving within the view of the 3D scene) or when the virtual viewpoint is being moved (e.g., the movement of the virtual viewpoint described above).

Additionally, the 3D scene may be updated based on changes of the first viewpoint (e.g., corresponding to changes of the eyepoint of a user). For example, the user may move his head, thereby changing the eyepoint location. Accordingly, a next viewpoint (which corresponds to the user's new eyepoint) may be determined after displaying the 3D scene and the view of the 3D scene. Based on this next viewpoint, the 3D scene may be updated and an updated stereoscopic image of the 3D scene may be provided by the display(s). Where the view of the 3D scene is also based on the viewpoint corresponding to the eyepoint of the user, the view of the 3D scene may be correspondingly updated as well.

Figure 7:
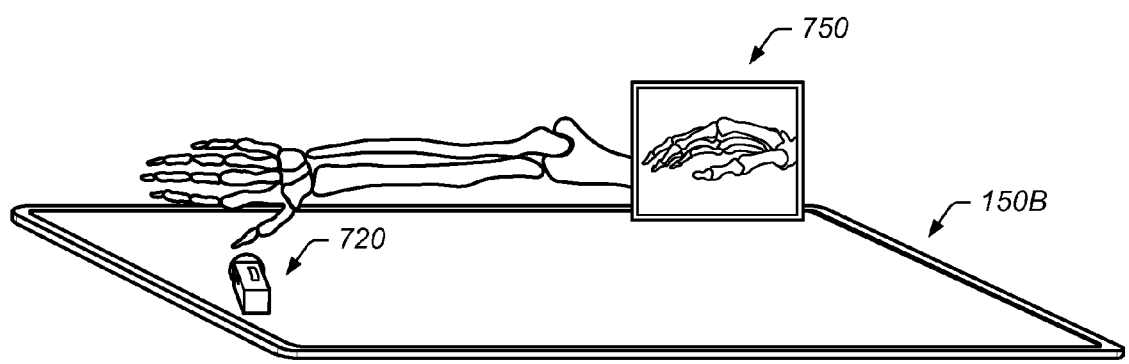
FIG. 7 illustrates an exemplary horizontal display presenting an exemplary 3D scene and view of the 3D scene, according to one embodiment.

FIG. 7—Exemplary 3D Scene and View of the 3D Scene

FIG. 7 illustrates an exemplary 3D scene and view of the 3D scene according to the method of FIG. 6. This Figure is exemplary only and other 3D scenes, views of the 3D scene (including size, orientation, position, etc.), and mechanisms of presenting the 3D scene (e.g., numbers and use of display devices) are envisioned.

In the example of FIG. 7, a single horizontal display 150B is used. The horizontal display 150B may provide a stereoscopic image of the anatomy of an arm (in this case the bones of the arm). Within the 3D scene, a virtual object (in this case, a virtual camera object) 720 may be displayed. The user may be able to manipulate this virtual object via any number of mechanisms, such as the stylus 130, described above. For example, the user may select the virtual object 720 for changing its position or orientation. In response, the view of the 3D scene from the viewpoint of the virtual object 720 may be presented in the virtual display 750. In the embodiment shown, images of the virtual display 750 may not be stereoscopic (e.g., the same image of the virtual display 750 may be provided to both of the user's eyes). Additionally, the virtual display 750 has a different position and orientation than the real display 150B.

Thus, FIG. 7 illustrates an exemplary system where the user may manipulate the virtual object 720 to specify a virtual viewpoint. As described in the method of FIG. 6, this virtual viewpoint may be used to render a view of the 3D scene on a virtual display 750 projected above the surface of the horizontal display 150B.

FIGS. 8A-16B—Exemplary Illustrations

FIGS. 8A-16B illustrate various virtual spaces and corresponding 3D scenes of the virtual spaces.

Figure 8A:
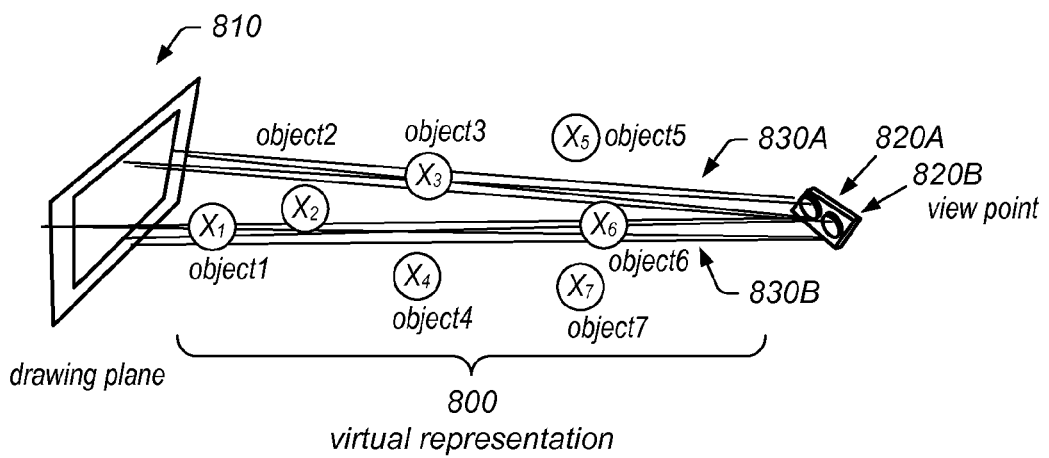
FIGS. 8A-16B are exemplary illustrations of the described embodiments.
Figure 8B:
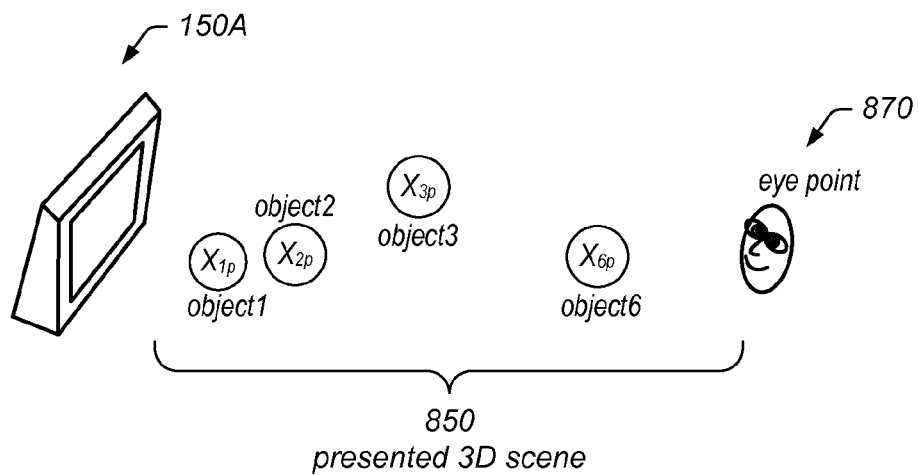

FIG. 8A illustrates a virtual representation, and FIG. 8B illustrates presentation of a 3D scene of the virtual space using the display 150A. Similar to descriptions above, the display 150A may be a stereo 3D display conveying a stereoscopic (left and right) image for stereo viewing.

In the virtual representation of FIG. 8A, various virtual objects of a virtual space are shown (objects 1-7). These seven objects are each in an x-y-z position in the virtual space as modeled within a computer. Additionally, the viewpoint 820 (including single viewpoints 820A and 820B) corresponds to the user's eyepoint in the physical space. Further, the drawing plane 810 corresponds to the display 150A in the physical space. In the FIG. 8A, the viewpoint 820 is represented by a device with two virtual eyes having viewpoints 820A and 820B, but in practice a single viewpoint may be used, but a stereo pair may be generated using a plus offset and/or a minus offset, where the plus and minus offset approximate the inter pupil distance of the user's eyepoint 870.

As shown, two frustums 830A and 830B are generated of a view from the viewpoint 820 (corresponding to single viewpoints 820A and 820B, which correspond to the eyepoint 870). In this specific example, the near plane of the frustums 830A and 830B correspond to the viewpoints 820A and 820B, but may not in other examples. As shown, objects 4, 5, and 7 are excluded from these frustums 830A and 830B and are therefore not present in the projection of FIG. 8B. The display 150A presents an image for each frustum of 830A and 830B which are presented to the user in order to present the 3D scene 850 of FIG. 8B. Thus, as shown in FIG. 8B, the virtual objects 1, 2, 3, and 6 are presented to the user via presentation of stereoscopic image(s) by the display 150A. However, it should be noted that only portions of objects 1, 2, 3, and 6 are presented where the whole of objects 1, 2, 3, and 6 are not present in the frustums 830A and 830B.

Figure 9A:
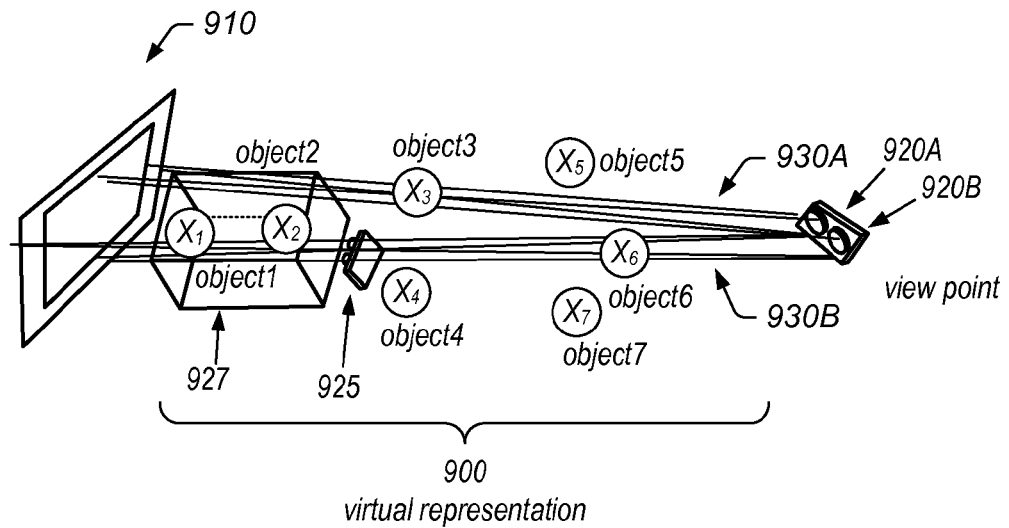
Figure 9B:
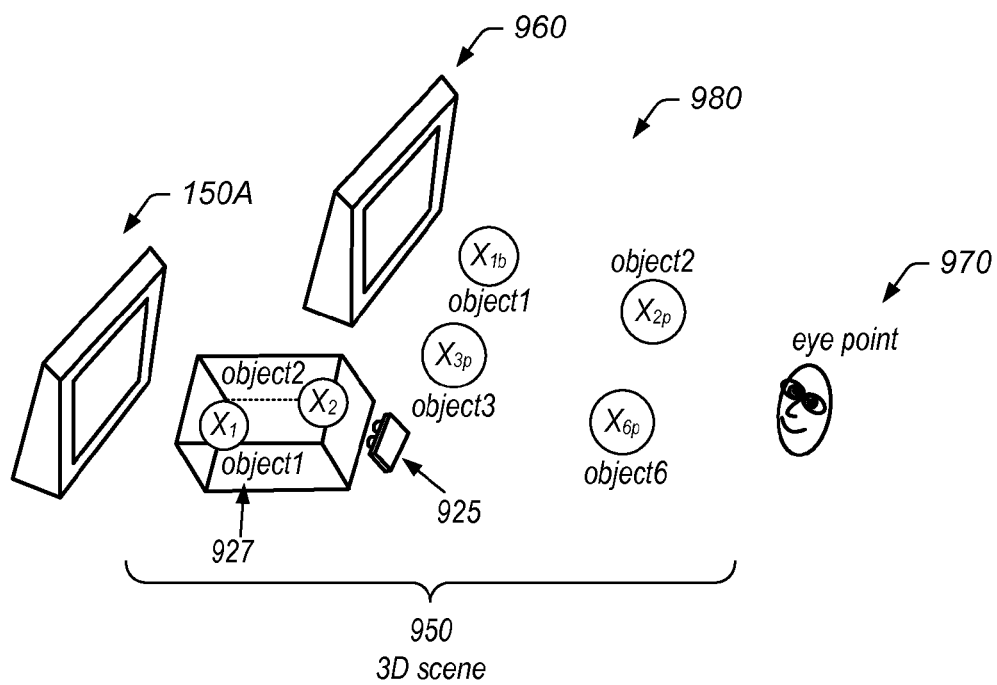

FIG. 9A illustrates a virtual representation 900, e.g., for magnification, and FIG. 9B illustrates a presentation of the 3D scene 950 of FIG. 9A (using the display 150A) as well as a 3D view of the scene of FIG. 9A (using a separate display 960, which may be similar to display 150A).

As shown within the virtual representation 900, the same objects as FIG. 8A are present. However, in this Figure a new viewpoint (a virtual viewpoint) 925 is shown. In this particular embodiment, the virtual viewpoint 925 (which is a stereoscopic viewpoint in this embodiment) is from the point of view of a virtual object 925. Objects 1 and 2 are present with the view volume 927 of the viewpoint 925. In the embodiment of FIG. 9B, within the 3D scene 950, the same objects as were previously shown in FIG. 8B are still presented to the user via stereoscopic image(s). In addition, the virtual object 925 and the view volume 927 is shown in the 3D scene 950. Further, on the display 960 a view of the 3D scene 980 from the point of view of the viewpoint 925 is shown for the user. As shown, the user views object 1 and object 2 of the view of the 3D scene from the position/orientation of the virtual object 925. Thus, the user may both view the entire 3D scene (which is just a portion of the virtual space 900) including the virtual object 925 and its view volume via display 150A and the view of the 3D scene from the virtual object 925 via display 960. Moreover, the 3D scene may be rendered for the eyepoint of the user from the viewpoint 920 and the view of the 3D scene may be rendered for the eyepoint of the user from the viewpoint 925 concurrently. In some embodiments, the view volume (from 920 to 910) from the viewpoint 920 may be considered a "wide angle view" while the view from viewpoint 925 may be considered a "narrow view". Thus, the "narrow view" may be a subsection of the "wide angle view".

The user may be able to manipulate the location and orientation of the viewpoint 925, as described above. Additionally, the user may be able to manipulate the view volume 927. By manipulating these parameters (among other possible parameters), the user may be able to magnify portions of the 3D scene for presentation by the display 960, thereby achieving a 3D zoom. Thus, instead of the conventional magnification or loupe tool with a two dimensional select region boundary, a three dimensional volume may be specified or selected. The 3D volume 927 may be any number of shapes, e.g., which may be controlled or specified by a user using an input device, such as a mouse, keyboard, or 3D input device. In one embodiment, the volume has a near boundary and a far boundary, where each of these two boundaries may be set at any position so the distance from the near and far boundaries may be close to each other or far apart (or anything in between). Furthermore, as indicated above, the position and orientation of the viewpoint 925 may be modified by the user.

However, in further embodiments, the user may simply specify the volume 927, and the viewpoint 925 may be determined automatically (e.g., and may not be shown in the 3D scene 950). Though there may be a position and/or orientation relationship between the viewpoint 925 and its corresponding view volume 927, they may be established independent of each other. For example, the viewpoint position/orientation relative to the view volume may be set by the user or may be a default. Furthermore, the view volume 927 itself may be set by the user or may be a default. The control of the movement of the selected volume 927 or the viewpoint 925 may cause re-rendering of one or more of the 3D scene(s) 950 and the view of the 3D scene 980 in a transparent and smooth manner.

As indicated above, the display 960 may be a distinct display or may be a virtual display within the 3D scene 950 presented by the display 150A. Additionally, the view of the 3D scene 980 may be stereoscopic or monoscopic, as desired. Further, the projection of the view of the 3D scene 980 may be rendered dependent or independent of the position/orientation of the display 960. Additionally, this rendering may be set by the user or may be a default. Similar remarks apply to the display 150A.

Figure 10A:
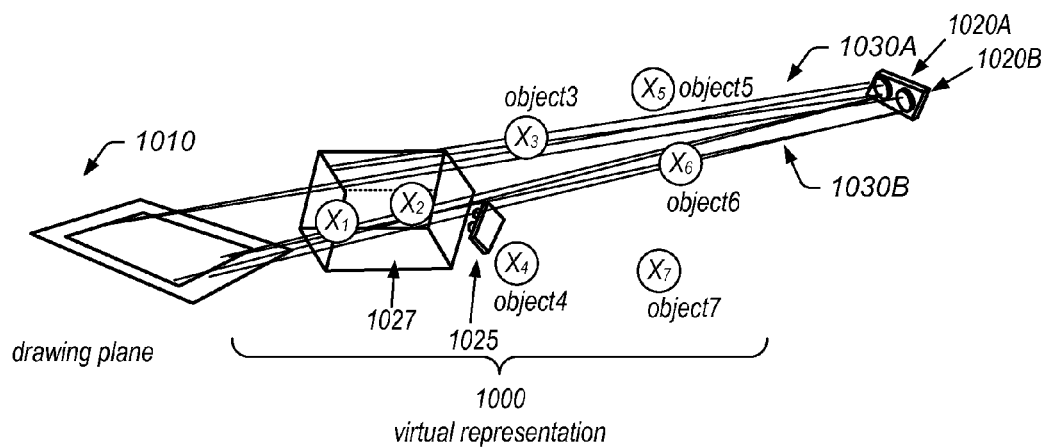
Figure 10B:
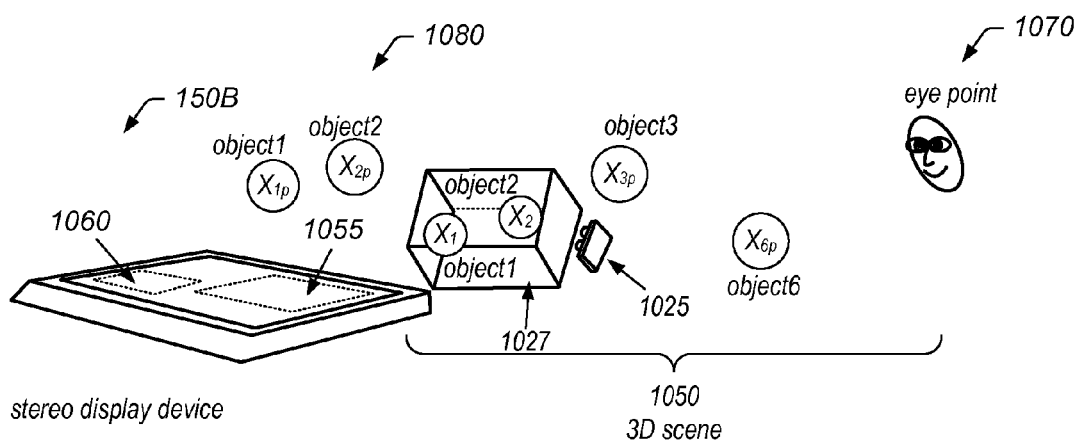

FIG. 10A illustrates a virtual representation 1000, and FIG. 10B illustrates a presentation of the 3D scene 1050 of FIG. 10A (using the display 150B) as well as a 3D view of the scene of FIG. 10A (using the same display 150B).

The descriptions of FIGS. 9A and 9B essentially apply to FIGS. 10A and 10B; however, as shown, instead of two distinct vertical displays, a single horizontal display 150B is used. Using this display 150B, two different 3D projections are provided, a first (1050) from the viewpoint 1020 using a portion (1055) of the display 150B and a second (1080) from the view point 1025, both rendered for the eyepoint 1070. Thus, the display 150B may provide a stereoscopic horizontal projection using display portion 1055 for the viewpoint 1020 (which directly corresponds to the eyepoint 1070) and may also provide a stereoscopic horizontal projection using display portion 1060 for the viewpoint 1025 (which does not directly correspond to the eyepoint 1070, but is rendered for that eyepoint). As shown, the 3D scene includes the four objects 1, 2, 3, and 6, the virtual object 1025, and the view volume 1027. The view of the 3D scene 1080 includes the objects 1 and 2 corresponding to the view volume 1027.

Figure 11:
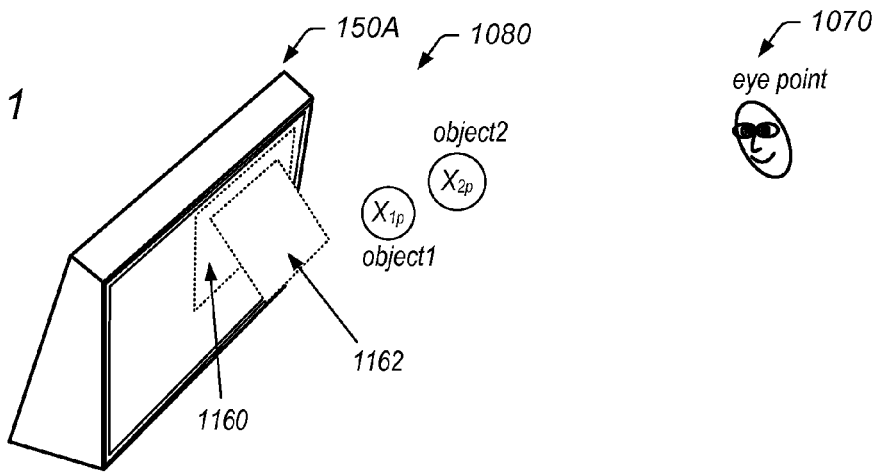

FIG. 11 illustrates a particular embodiment of the view of the 3D scene 1080, provided by the vertical display 150A. In this embodiment, the portion 1160 of the display 150A (similar to portion 1060 on the horizontal display 150B) may be used to present the view of the 3D scene 1080. In this particular embodiment, the user may see the view of the 3D scene 1080 from a virtual display 1162, which is arranged on a line perpendicular to the line of sight from the eyepoint 1070, rather than simply perpendicular to the display 150A. Thus, FIG. 11 illustrates an embodiment where a virtual display 1162 is used to present the view of the 3D scene 1080 to the user stereoscopically. Additionally, the virtual display 1162 has a different position and orientation than the portion 1160 of the screen 150B.

In the embodiment shown, this projected virtual display 1162 is presented stereoscopically as a left-right image pair, such that when viewed by the user at the eyepoint 1070 with both eyes, it is perceived as extending out from the surface of the display 150B. However, the virtual display 1162 may be presented in a manner such that it appears behind the display 150B, in front of the display 150B, and/or at one of many angles and orientations. These setting may be dependent upon the user eyepoint position 1070, user selectable, or at some default and conveyed at one of many projections.

Figure 12:
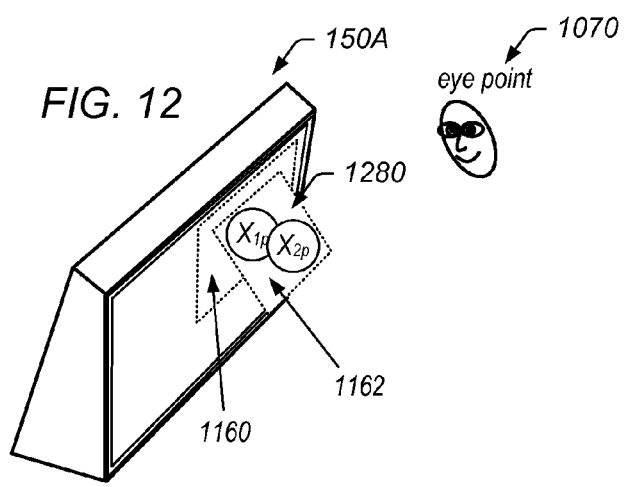

FIG. 12 illustrates an alternate embodiment where the virtual display 1162 is as before, but the region volume objects are conveyed in monoscopic, being a single eye view. The mono conveyance appears to the user to be at the virtual surface of the virtual display 1162 rather than in front of the display, as in FIG. 11.

Figure 13:

FIG. 13 illustrates a similar embodiment to FIG. 11, except the vertical display 150A is replaced with the horizontal display 150B (also similar to FIGS. 10A and 10B). Similar to FIG. 11, the portion 1055 may be used to present the 3D scene 1050, and the portion 1060 may be used to present the view of the 3D scene 1080. However, similar to the embodiment of FIG. 11, the portion 1060 may be used to present a virtual display 1362 for presenting the view of the 3D scene 1080. Variations similar to the virtual display 1162 apply to the virtual display 1362.

Figure 14A:
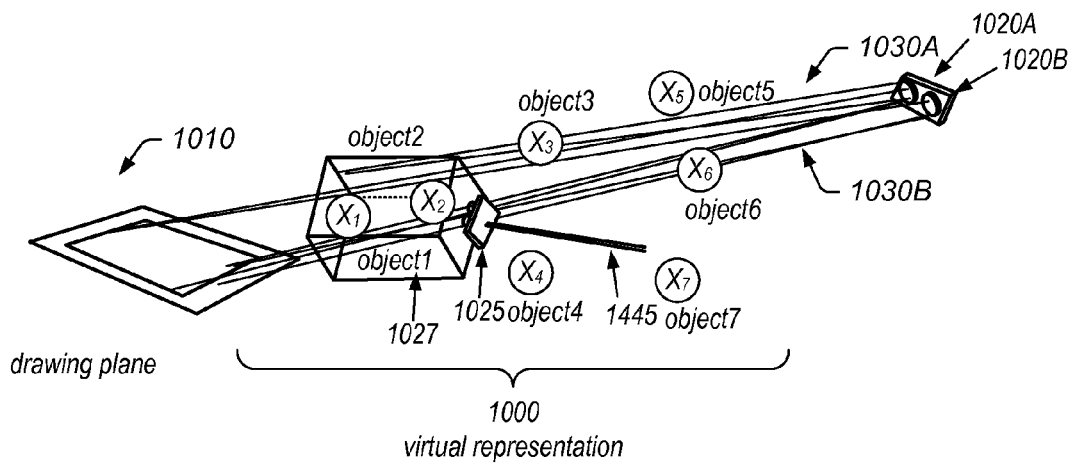
Figure 14B:
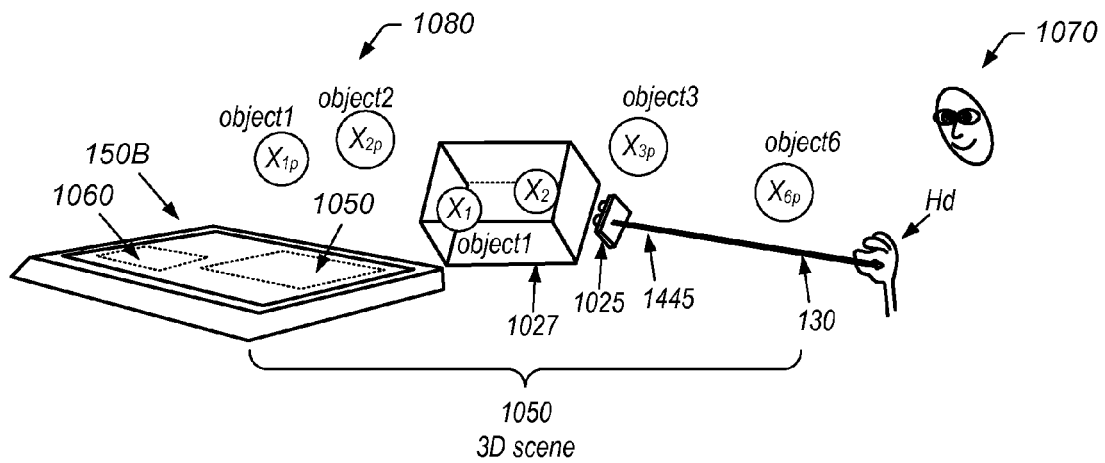

FIG. 14A illustrates the virtual representation 1000 with an interactive element 1445, which may act as an extension to stylus 130 (shown in FIG. 14B and described below), and FIG. 14B illustrates the presentation of the 3D scene 1050 corresponding to the virtual representation 1000 of FIG. 14A (using the display 150B) as well as a 3D view of the scene corresponding to the view volume 1027 of FIG. 14A (using the same display 150B).

In this embodiment, the user may interact with the virtual object 1025 and/or the view volume 1027 via the stylus 130. In the embodiment shown, the physical stylus 130 may be extended in the 3D scene 1050 via the projected, virtual stylus 1445. Thus, the stylus 130 may have a virtual, displayed extension 1445 which begins from the end of the physical stylus 130. To specify the viewpoint 1025 and/or the view volume 1027, the user may use the stylus 130 in a position for manipulating the viewpoint 1025 (e.g., for selection and movement) or the view volume 1027 (e.g., to specify the boundaries of the view volume 1027).

The hand held tool may be any tracked device, e.g., in terms of position and orientation. The stylus 130 may be of a variety of shapes and it may or may not have the virtual stylus 1445, as an extension or otherwise. Additionally, instead of acting as an extension, the virtual stylus 1445 may move according to corresponding movements of the stylus 130, but may not appear to be connected at all. In the embodiment shown, the stylus 130 has the virtual stylus 1445 that is appears as an extension to the stylus 130, e.g., via stereoscopic images provided to the eyepoint 1070.

As the user moves the stylus 130, certain corresponding actions may occur. In one embodiment, the corresponding virtual stylus 1445 is repositioned both in the virtual representation and the 3D scene. In another embodiment, the viewpoint 1025 and/or the view volume 1027 may be specified or moved. For example, the view volume 1027 may have its boundaries adjusted. In another embodiment, the virtual stylus 1445 may not be rendered and hence may not be imaged nor seen by the user, but the viewpoint object 1025 may allow the user to have a feedback mechanism of where the stylus 130 is pointing. The imaged distance between the far tip of the stylus 130 or the virtual stylus 1445 and the user perceived imaged viewpoint object 1025 can be set based on different parameters, such as user or design preferences. The higher the resolution of the position/orientation accuracy of the stylus 130, the closer the viewpoint object 1025 may be to it. At times it may be desirable to have the viewpoint object 1025 positioned to be coincident to the far tip of the stylus 130 or the virtual stylus 1445. That way the user may accommodate his eyes to the hand held tool tip, which allows for a truer ability to position the viewpoint object 1025 in relation to the stereo imaged virtual objects the user may wish to probe.

Figure 15A:
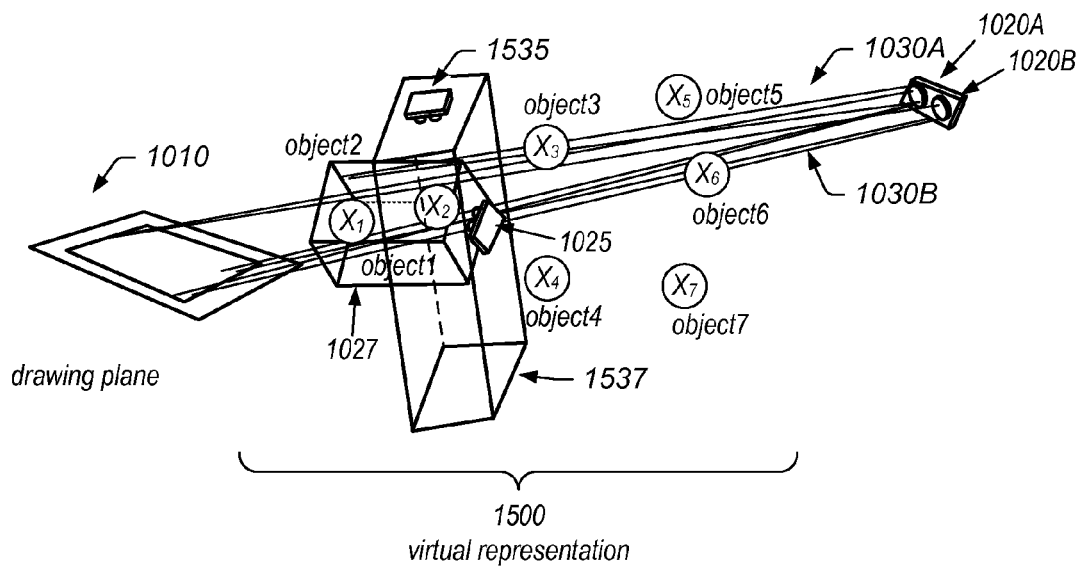
Figure 15B:
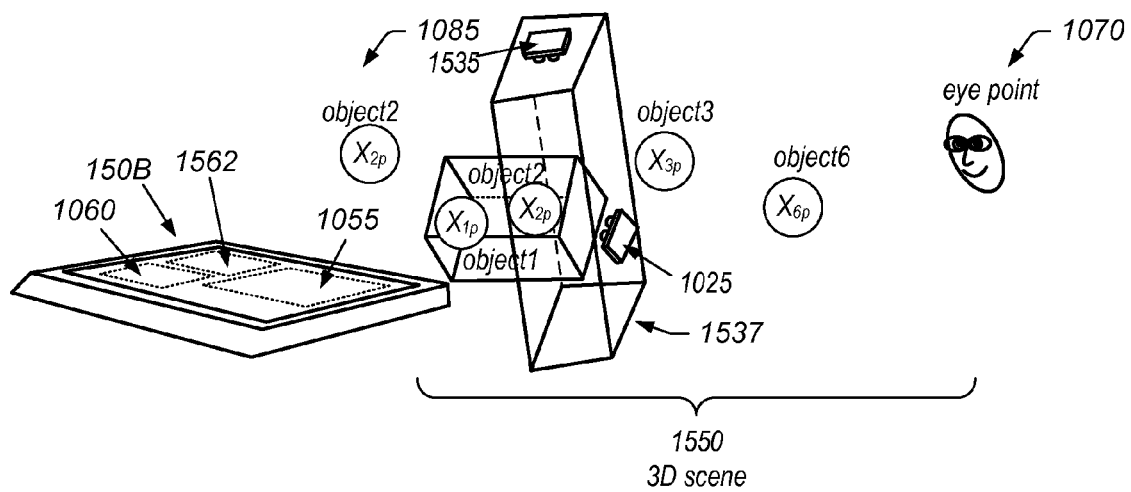

It is also possible to have multiple virtual volumes within a 3D scene, e.g., where one view volume is within or includes a second view volume. FIG. 15A illustrates the virtual representation 1500 with view volume 1027 from viewpoint 1025 as well as another view volume 1537 from viewpoint 1535, which has a different position and orientation than view volume 1027 and overlaps with view volume 1027. FIG. 15B illustrates a portion of the presentation of the 3D scene 1550 of FIG. 15A (using the display 150B) as well as a 3D view of the scene of FIG. 15A (using the same display 150B) according to the viewpoint 1535.

As shown, the display 150B may include three portions, 1055 for the 3D scene 1550, 1060 for the view of the 3D scene 1080 (not shown in FIG. 15B), and 1562 for the view of the 3D scene 1085. Since the view volume 1537 only includes object 2, the corresponding view of the 3D scene 1085 only includes object 2. Similar to above, the view volume may be presented according to any of the various possibilities already enumerated above.

Different methods for activating a subsequent view volumes or viewpoints include keyboard selection, mouse selection, stylus 130, virtual stylus 1445, etc. As each viewpoint or view volume is created, the previously created viewpoint or view volume may either remain or may be removed, either by user input or by default, as desired. For those viewpoints or view volumes that remain, their positions within the virtual space may be stored, e.g., as a bookmark for later revisiting. The creation of these viewpoints or view volumes may be specified by placing the stylus 130 in a position and having that position be stored, so the stylus 130 may then be moved to a resting position or for establishing subsequent viewpoints or view volumes.

Figure 16A:
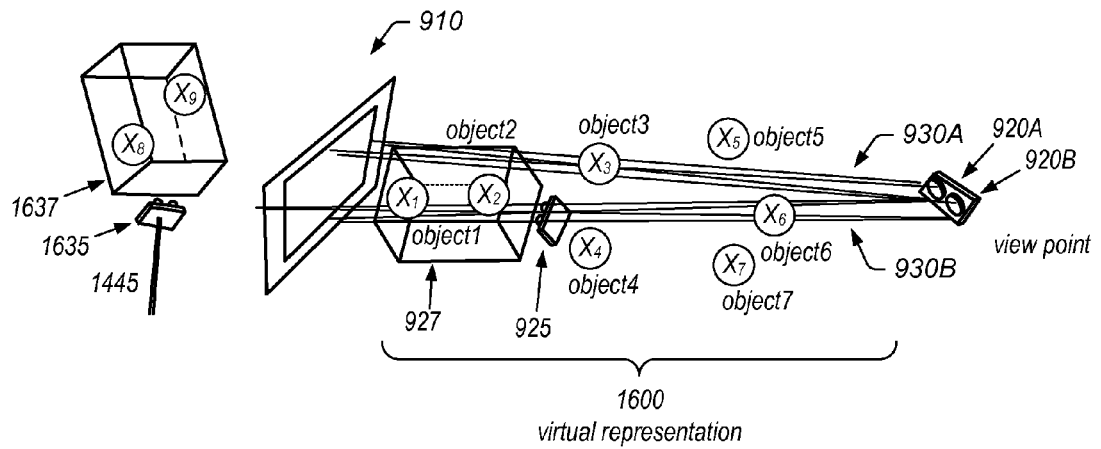
Figure 16B:
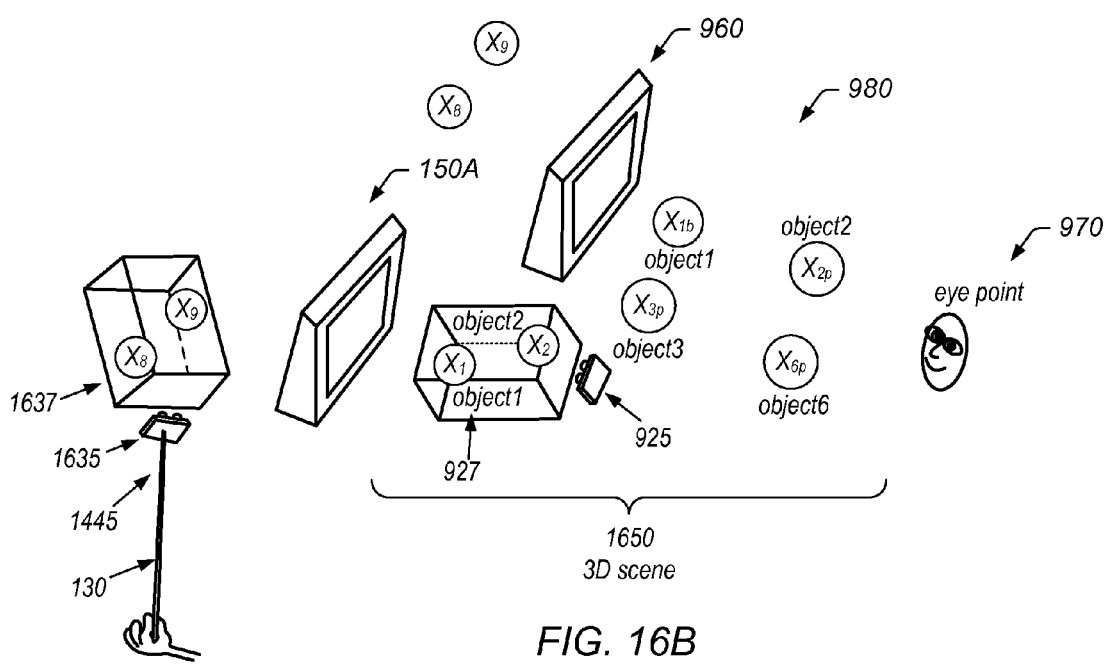

FIG. 16A illustrates the virtual representation 1600 with an interactive element 1445, which may act as an extension to stylus 130, and FIG. 16B illustrates the presentation of the 3D scene 1650 of FIG. 16A (using the display 150A) as well as a 3D view of the scene of FIG. 16A (using a second display 960).

In the embodiment shown, the user may manipulate objects behind the display 150A via the stylus 130 and/or virtual stylus 1445, e.g., to manipulate viewpoint 1635 and/or view volume 1637, which includes objects 8 and 9. In this embodiment, the display 150A may be a see-through OLED prototype laptop with a 14-inch transparent, see-through color OLED screen, which may be capable of providing stereoscopic images according to the viewpoint 920. With the see-through display, the stylus 130 may be used in both in front of the display 150A and behind the display 150A. As stereo imagery is rendered to be seen both in front of the screen and behind the screen, with the see-through display 150A, the user may position the stylus 130 (or even the virtual stylus 1445) on either side of the display 150A. Thus, the user may position the stylus 130 (e.g., for use as or for manipulating a virtual magnifier, virtual camera, or probe tool) on either side of the display, and the extension 1445 (when present) may be shown on either side as well, via rendered stereoscopic images. Thus, in one embodiment, the virtual stylus 1445 may extend the stylus 130 regardless of whether the stylus 130 is in front of or behind the screen 150A.

In the embodiment shown, the virtual representation, displays, and 3D scenes may be similar to that of FIGS. 9A and 9B, save for the addition of the two objects 8 and 9 (shown behind the screen 960 and 150A) and the user manipulation of FIGS. 14A and 14B. All of the variations described above may also apply to this figure, e.g., with multiple virtual viewpoints and view volumes, etc.

Further Embodiments

In further embodiments, the virtual viewpoint described above may be recorded and saved for later playback. For example, the viewpoint may be bookmarked Additionally, where the virtual viewpoint corresponds to a virtual object, e.g., a virtual camera, it may be possible to record the view of the 3D scene, e.g., as a movie, from the view point of the virtual camera. This recording may be stored and played back at a later time. Further, the virtual object (e.g., the virtual camera) may be able to illuminate a portion of the 3D scene being viewed by the camera, e.g., similar to a flashlight.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for presenting a view based on a virtual viewpoint in a three dimensional (3D) scene, comprising:

tracking a position of a head of a user using a position input device, wherein said tracking comprises assessing X, Y, and Z coordinates, an angle, and an orientation;

assessing a first eyepoint of a user using a first head position;

presenting the 3D scene by at least one display according to a first viewpoint with respect to the at least one display, wherein said presenting the 3D scene comprises displaying at least one stereoscopic image of the 3D scene by the at least one display, wherein the first viewpoint corresponds to a first eyepoint of a user viewing the 3D scene;

assessing a second eyepoint of a user using a second head position;

presenting the 3D scene by at least one display according to a second viewpoint with respect to the at least one display, wherein the second viewpoint corresponds to a second eyepoint of a user;

determining a first virtual viewpoint within the 3D scene, wherein the first virtual viewpoint is different than the first viewpoint, wherein the first virtual view point corresponds to a first X, Y, and Z location and a first angle and a first orientation in physical space and maps to a first coordinate in the 3D scene, wherein the first X, Y, and Z location and the first angle and the first orientation is assessed using the position input device, wherein the first coordinate comprises a second X, Y, and Z location in the 3D scene, and wherein the first coordinate comprises a second angle and a second orientation in the 3D scene;

presenting the view of the 3D scene by the at least one display according to the first virtual viewpoint, wherein said presenting the view of the 3D scene according to the first virtual viewpoint is performed concurrently with said presenting the 3D scene according to the first viewpoint;

determining a second virtual viewpoint within the 3D scene, wherein the second virtual viewpoint is different than the first virtual viewpoint, wherein the second virtual view point corresponds to a third X, Y, and Z location and a third angle and a third orientation in physical space and maps to a second coordinate in the 3D scene, wherein the third X, Y, and Z location and the third angle and the third orientation is assessed using the position input device, wherein the second coordinate comprises a fourth X, Y, and Z location in the 3D scene, and wherein the second coordinate comprises a fourth angle and a fourth orientation in the 3D scene; and presenting the view of the 3D scene by the at least one display according to the second virtual viewpoint;

wherein said presenting the view of the 3D scene according to the second virtual viewpoint is performed concurrently with said presenting the 3D scene according to the first or second viewpoint.

2. The method of claim 1, wherein the first virtual viewpoint is selected by a user.

3. The method of claim 1, wherein the first virtual viewpoint is selected by a user using a physical device positioned in an X, Y, and Z location and an angle and orientation in open space of the at least one display.

4. The method of claim 3, wherein the first virtual viewpoint is selected via a virtual object presented in the 3D scene, wherein movement of the physical device by the user has a one to one correspondence with corresponding movement of the virtual object within the 3D scene.

5. The method of claim 1, wherein said presenting the 3D scene comprises graphically indicating a frustum of the view of the 3D scene within the 3D scene.

6. The method of claim 1, wherein said presenting the view of the 3D scene comprises displaying at least one stereoscopic image of the view of the 3D scene by the at least one display.

7. The method of claim 1, wherein said presenting the view of the 3D scene is also based on the first or second viewpoint.

8. The method of claim 1, further comprising:
moving the first virtual viewpoint in response to user input;
wherein said determining the first virtual viewpoint and said presenting the view of the 3D scene are performed a plurality of times during said moving.

9. The method of claim 1, wherein the first virtual viewpoint is from the position/orientation of a virtual object rendered and displayed within the 3D scene.

10. The method of claim 9,
moving the virtual object within the 3D scene in response to user input;
wherein said determining the first virtual viewpoint and said presenting the view of the 3D scene are performed a plurality of times during said moving the virtual object.

11. The method of claim 10,
wherein the 3D scene is presented at a first frame rate;
wherein said determining the first virtual viewpoint and said presenting the view of the 3D scene are performed during said moving the virtual object at substantially the first frame rate.

12. The method of claim 9, wherein the virtual object is a virtual camera object, where the virtual camera object may be viewed as positioned and oriented commensurate with the second X, Y, and Z location and the second angle and second orientation.

13. The method of claim 9, wherein the virtual object is a virtual magnifying glass object.

14. The method of claim 1, further comprising:
determining a field of view of the first virtual viewpoint;
wherein said presenting the view of the 3D scene is based on the field of view of the first virtual viewpoint.

15. The method of claim 1, further comprising:
determining a magnification of the 3D scene for the first virtual viewpoint;
wherein said presenting the view of the 3D scene is based on the magnification.

16. The method of claim 1,
determining a view volume for the first virtual viewpoint;
wherein said presenting the view of the 3D scene is based on the view volume.

17. The method of claim 1, wherein the view of the 3D scene from the perspective of the first virtual viewpoint is magnified compared to a corresponding portion in the 3D scene.

18. The method of claim 1, wherein the at least one display comprises a vertical display and a horizontal display, wherein said presenting the 3D scene comprises 1) displaying, according to a horizontal perspective, a first stereoscopic image on the horizontal display, and 2) displaying, according to a vertical perspective, a second stereoscopic image on the vertical display.

19. The method of claim 1, wherein the at least one display comprises a plurality of displays, wherein said displaying the 3D scene is performed on a first display and said displaying the view of the 3D scene is performed on a second display.

20. The method of claim 1, wherein said presenting the view of the 3D scene is performed at a position and orientation that is different from a position and orientation of the at least one display.

21. A non-transitory computer accessible memory medium storing program instructions for presenting a view based on a virtual viewpoint in a three dimensional (3D) scene, wherein the program instructions are executable by a processor to:
  track a position of a head of a user using a position input device, wherein said tracking comprises assessing X, Y, and Z coordinates, an angle, and an orientation;
  assess a first eyepoint of a user using a first head position;
  present the 3D scene via at least one display according to a first viewpoint with respect to the at least one display, wherein said presenting the 3D scene comprises the at least one display displaying at least one stereoscopic image of the 3D scene, and wherein the first viewpoint corresponds to a first eyepoint of a user viewing the 3D scene;
  assess a second eyepoint of a user using a second head position;
  present the 3D scene by at least one display according to a second viewpoint with respect to the at least one display, wherein the second viewpoint corresponds to a second eyepoint of a user;
  determine a first virtual viewpoint within the 3D scene, wherein the virtual viewpoint is different than the first viewpoint, wherein the first virtual view point corresponds to a first X, Y, and Z location and a first angle and a first orientation in physical space and maps to a first coordinate in the 3D scene, wherein the first X, Y, and Z location and the first angle and the first orientation is assessed using the position input device, wherein the first coordinate comprises a second X, Y, and Z location in the 3D scene, and wherein the first coordinate comprises a second angle and a second orientation in the 3D scene;
  present the view of the 3D scene via the at least one display according to the virtual viewpoint, wherein said presenting the view of the 3D scene according to the first virtual viewpoint is performed concurrently with said presenting the 3D scene according to the first viewpoint;
  determine a second virtual viewpoint within the 3D scene, wherein the second virtual viewpoint is different than the first virtual viewpoint, wherein the second virtual view point corresponds to a third X, Y, and Z location and a third angle and a third orientation in physical space and maps to a second coordinate in the 3D scene, wherein the third X, Y, and Z location and the third angle and the third orientation is assessed using the position input device, wherein the second coordinate comprises a fourth X, Y, and Z location in the 3D scene, and wherein the second coordinate comprises a fourth angle and a fourth orientation in the 3D scene; and
  present the view of the 3D scene by the at least one display according to the second virtual viewpoint;
  wherein said presenting the view of the 3D scene according to the second virtual viewpoint is performed concurrently with said presenting the 3D scene according to the first or second viewpoint.

22. The memory medium of claim 21,
  wherein the first virtual viewpoint is selected by a user.

23. The memory medium of claim 21,
  wherein the first virtual viewpoint is selected by a user using a physical device in open space of at least one display positioned in an X, Y, and Z location and an angle and orientation.

24. The memory medium of claim 23,
  wherein the first virtual viewpoint is selected via a virtual object presented in the 3D scene, wherein movement of the physical device by the user has a one to one correspondence with corresponding movement of the virtual object within the 3D scene.

25. The memory medium of claim 21,
  wherein said presenting the view of the 3D scene comprises displaying at least one stereoscopic image of the view of the 3D scene by the at least one display.

26. The memory medium of claim 21,
  wherein said presenting the view of the 3D scene is also based on the first viewpoint.

27. The memory medium of claim 21, wherein the program instructions are further executable to:
  move the first virtual viewpoint in response to user input;
  wherein said determining the first virtual viewpoint and said presenting the view of the 3D scene are performed a plurality of times during said moving.

28. The memory medium of claim 21, wherein the at least one display comprises a vertical display and a horizontal display, wherein said presenting the 3D scene comprises 1) displaying, according to a horizontal perspective, a first stereoscopic image on the horizontal display, and 2) displaying, according to a vertical perspective, a second stereoscopic image on the vertical display.

29. The memory medium of claim 21, wherein the view of the 3D scene is presented at a position and orientation that is different from a position and orientation of the at least one display.

30. A system for presenting a view based on a virtual viewpoint in a three dimensional (3D) scene, comprising:
  a processor;
  an input device configured to provide information to the processor indicating a current viewpoint of the user;
  at least one display coupled to the processor;
  a memory medium coupled to the processor which stores program instructions executable to:
    track a position of a head of a user using a position input device, wherein said tracking comprises assessing X, Y, and Z coordinates, an angle, and an orientation;
    assess a first eyepoint of a user using a first head position;
    present the 3D scene via the at least one display according to a first viewpoint with respect to the at least one display, wherein said presenting the 3D scene comprises the at least one display displaying at least one stereoscopic image of the 3D scene, and wherein the first viewpoint corresponds to a first eyepoint of a user viewing the 3D scene;
    assess a second eyepoint of a user using a second head position;
    present the 3D scene by at least one display according to a second viewpoint with respect to the at least one display, wherein the second viewpoint corresponds to a second eyepoint of a user;

determine a first virtual viewpoint within the 3D scene, wherein the virtual viewpoint is different than the current viewpoint of the user, wherein the first virtual view point corresponds to a first X, Y, and Z location and a first angle and a first orientation in physical space and maps to a first coordinate in the 3D scene, wherein the first X, Y, and Z location and the first angle and the first orientation is assessed using the position input device, wherein the first coordinate comprises a second X, Y, and Z location in the 3D scene, and wherein the first coordinate comprises a second angle and a second orientation in the 3D scene;

present the view of the 3D scene via the at least one display according to the virtual viewpoint, wherein said presenting the view of the 3D scene according to the first virtual viewpoint is performed concurrently with said presenting the 3D scene according to the first viewpoint;

determine a second virtual viewpoint within the 3D scene, wherein the second virtual viewpoint is different than the first virtual viewpoint, wherein the second virtual view point corresponds to a third X, Y, and Z location and a third angle and a third orientation in physical space and maps to a second coordinate in the 3D scene, wherein the third X, Y, and Z location and the third angle and the third orientation is assessed using the position input device, wherein the second coordinate comprises a fourth X, Y, and Z location in the 3D scene, and wherein the second coordinate comprises a fourth angle and a fourth orientation in the 3D scene; and present the view of the 3D scene by the at least one display according to the second virtual viewpoint;

wherein said presenting the view of the 3D scene according to the second virtual viewpoint is performed concurrently with said presenting the 3D scene according to the first or second viewpoint.

31. The system of claim 30, further comprising:
an input device configured to communicate with the processor, wherein the input device is configured for use by a user to manipulate the 3D scene;
wherein the first virtual viewpoint is selected by a user using the input device.

32. The system of claim 30,
wherein said presenting the view of the 3D scene comprises displaying at least one stereoscopic image of the view of the 3D scene by the at least one display.

33. The system of claim 30,
wherein said presenting the view of the 3D scene is also based on the first viewpoint.

34. The system of claim 30, wherein the at least one display comprises a vertical display and a horizontal display, wherein said presenting the 3D scene comprises 1) displaying, according to a horizontal perspective, a first stereoscopic image on the horizontal display, and 2) displaying, according to a vertical perspective, a second stereoscopic image on the vertical display.

* * * * *